US011173651B2

(12) United States Patent
Laurent et al.

(10) Patent No.: US 11,173,651 B2
(45) Date of Patent: Nov. 16, 2021

(54) FILM APPLICATION DEVICE AND FILM APPLICATION METHOD

(71) Applicant: 3M INNOVATIVE PROPERTIES COMPANY, Saint Paul, MN (US)

(72) Inventors: Michel Laurent, Cergy Pontoise Cedex (FR); Takayoshi Fujino, Tokyo (JP); Masayuki Kubota, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 435 days.

(21) Appl. No.: 16/336,733

(22) PCT Filed: Oct. 17, 2017

(86) PCT No.: PCT/IB2017/056451
§ 371 (c)(1),
(2) Date: Mar. 26, 2019

(87) PCT Pub. No.: WO2018/078486
PCT Pub. Date: May 3, 2018

(65) Prior Publication Data
US 2021/0276242 A1    Sep. 9, 2021

(30) Foreign Application Priority Data

Oct. 25, 2016 (EP) .................................. 16195576

(51) Int. Cl.
B29C 63/00        (2006.01)
B29C 63/02        (2006.01)
B29L 31/30        (2006.01)
B29C 63/04        (2006.01)

(52) U.S. Cl.
CPC .......... *B29C 63/04* (2013.01); *B29C 63/0004* (2013.01); *B29C 63/02* (2013.01); *B29L 2031/3055* (2013.01)

(58) Field of Classification Search
None
See application file for complete search history.

(56) References Cited

U.S. PATENT DOCUMENTS

2016/0176173 A1    6/2016    Kubota
2017/0015090 A1    1/2017    Kubota

FOREIGN PATENT DOCUMENTS

| CA | 2218453 | 4/1998 |
| FR | 2854593 | 11/2004 |
| FR | 2946934 | 12/2010 |

(Continued)

OTHER PUBLICATIONS

International Search report for PCT International Application No. PCT/IB2017/056451 dated Jan. 24, 2018, 4 pages.

*Primary Examiner* — Barbara J Musser
(74) *Attorney, Agent, or Firm* — Philip P. Soo

(57) ABSTRACT

A film application device for applying a film to an object, the device including a film supporting unit that disposes a film above the object; a first rod that extends in a first direction that intersects a vertical direction, presses on the film disposed above the object from an upper side, deforms and conforms to a shape of the object, and moves in a second direction that intersects the first direction and the vertical direction; a tensioning part that imparts tension outward in the first 0 direction on at least a first end side in the first direction of the first rod; and a movement part that moves the first rod in the vertical direction.

15 Claims, 18 Drawing Sheets

(56) References Cited

FOREIGN PATENT DOCUMENTS

| | | |
|---|---|---|
| GB | 2260938 | 5/1993 |
| JP | H0745186 | 12/1993 |
| JP | 2001-219470 | 8/2001 |
| WO | WO 2000-021734 | 4/2000 |
| WO | WO 2001-068352 | 9/2001 |
| WO | WO 2004-080696 | 9/2004 |
| WO | WO 2004-098861 | 11/2004 |
| WO | WO 2005-021241 | 3/2005 |
| WO | WO 2008-067801 | 6/2008 |
| WO | WO 2015-138304 | 9/2015 |

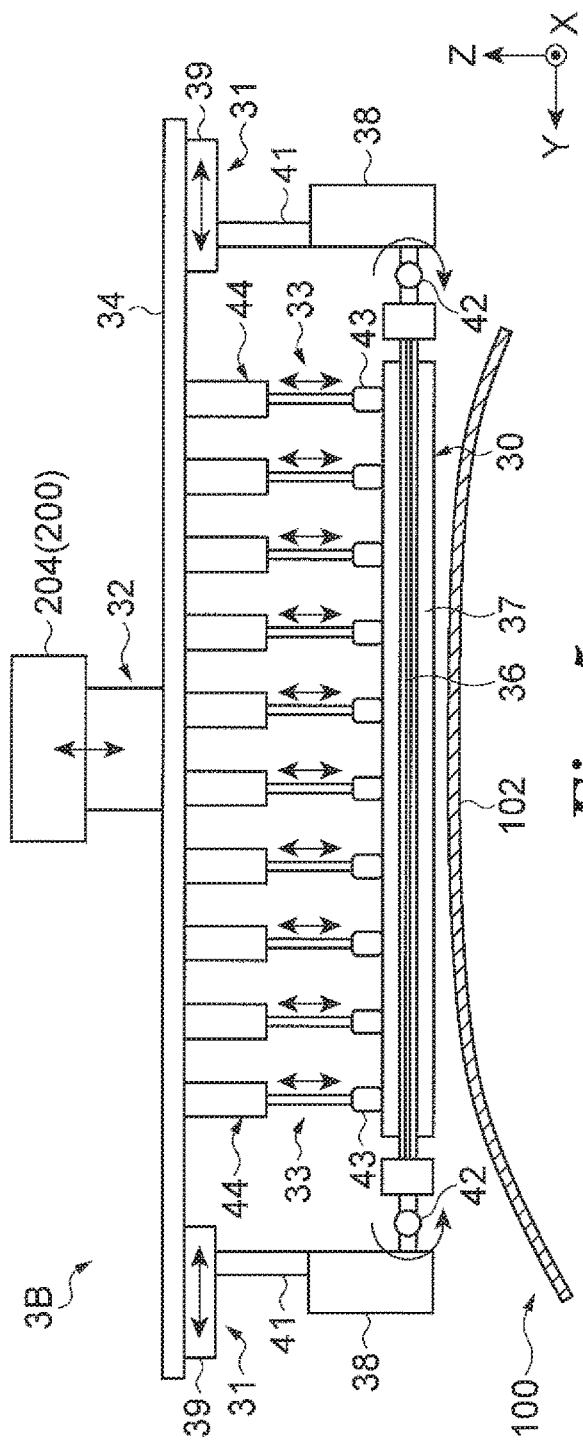
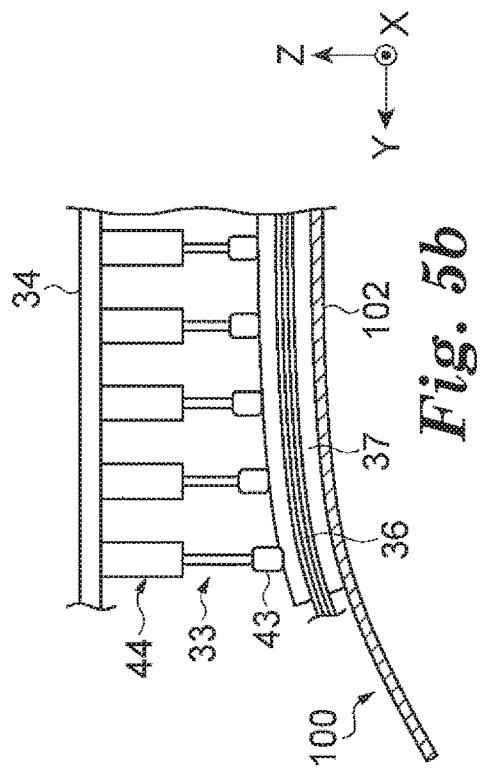

FILM APPLICATION DEVICE AND FILM APPLICATION METHOD

CROSS REFERENCE TO RELATED APPLICATIONS

This application is a national stage filing under 35 U.S.C. 371 of PCT/IB2017/056451, filed 17 Oct. 2017, which claims the benefit of EP Application No. 16195576.0 filed 25 Oct. 2016, the disclosures of which are incorporated by reference in their entirety herein.

TECHNICAL FIELD

The present invention relates to a film application device, a device for applying adhesive-backed film (e.g., a film in sheet form) onto the surface of an object (e.g., part of a vehicle body), a device for applying paint replacement film onto the surface of an object, and a film application method.

BACKGROUND ART

In recent years, vehicles, or other objects (e.g., appliances) are sometimes painted with several colors, and in some cases, at least one of these several colors is applied by applying an adhesive-backed paint replacement film, rather than a liquid paint, to the surface of the object (e.g., a portion of a vehicle body). Such paint replacement films are intended to replace liquid paint and, therefore, must exhibit the painted surface characteristics required for the object. Japanese Unexamined Patent Application Publication No. 2016-120605 describes application of a film to the roof of an object.

SUMMARY OF INVENTION

In the film application described above, the film was applied to an object, such as the roof of a vehicle, which is substantially flat and for which a sloping angle is moderate. However, in recent years, when applying films to various objects, there is a need to apply the film not only to locations where the sloping angle is moderate such as on the roof of a vehicle, but also at locations where the sloping angle is great such as, for example, the side walls extending down from and continuous with the roof.

A film application device according to a first aspect of the present invention is a film application device for applying a film (e.g., an adhesive-backed paint replacement film) to an object, the device including a film supporting unit that disposes a film above the object; a first rod that extends in a first direction that intersects a vertical direction, presses on the film disposed above the object from an upper side, deforms and conforms to a shape of the object, and moves in a second direction that intersects the first direction and the vertical direction; a tensioning part that imparts tension outward in the first direction to at least a first end side in the first direction of the first rod; and a movement part that moves the first rod in the vertical direction.

According to this aspect, the tensioning part imparts tension outward in the first direction to the first rod that extends in the first direction. Additionally, the movement part can press the first rod against the object by lowering downward the first rod to which tension is imparted. Here, the first rod deforms and conforms to the shape of the object. Accordingly, in cases where the object not only has locations where the sloping angle is moderate, but also has locations where the sloping angle is great, the first rod can deform so as to conform to the locations where the sloping angle is great. While deformed in this manner, the first rod moves in the second direction while pressing on the film and, thereby, the film can also be excellently applied to the locations where the sloping angle is great. As a result of the configuration described above, the film can be applied to both locations where the sloping angle is moderate and locations where the sloping angle is great in the object.

With a film application device according to another aspect, the first rod may include a core portion; and an application part disposed on an outer periphery side of the core portion, that has a lower hardness than at least the core portion.

With a film application device according to another aspect, the core portion may be constituted by a cylindrical member that has a Shore A hardness of 60 to 90; and the application part may be a member that has a Shore B hardness of 20 to 50.

A film application device according to another aspect may further include a first pressure roller that moves with the first rod while pressing the first rod against the object.

A film application device according to another aspect may further include a second rod that extends in the second direction, presses on the film disposed on an edge portion side in the first direction of the object from the first direction side, deforms corresponding to a shape of the object, and moves in the first direction; and a second pressure roller that moves with the second rod while pressing the second rod against the object.

With a film application device according to another aspect, the second pressure roller may be capable of pressing the second rod toward the first direction against the film and the object.

With a film application device according to another aspect, the film supporting unit may include a frame body at a position more to an outer periphery side than the object, that supports a peripheral edge of the film; and the frame body may impart tension outward in a planar direction to the film.

With a film application device according to another aspect, the frame body may be capable of adjusting a distance between the film and the object at the start of the application of the film.

With a film application device according to another aspect, the frame body may be capable of curving corresponding to a curving shape of the object.

With a film application device according to another aspect, when the film is being applied to the object by the first rod, the frame body may deform so as to conform to the curving shape at an application location of the object.

A film application method according to an aspect of the present invention is a film application method for applying a film (e.g., an adhesive-backed paint replacement film) to an object, the method comprising a film disposing step for disposing a film above an object; a first tensioning step for preparing a first rod that extends in a first direction that intersects a vertical direction, and deforms and conforms to a shape of the object, and imparting tension outward in the first direction to the first rod; a first pressing step for lowering the first rod downward and pressing the film against the object; and a first moving step for moving the first rod in a second direction that intersects the first direction and the vertical direction.

According to this aspect, actions and effects similar to those described above for the film application device can be obtained.

A film application method according to another aspect may further include a second tensioning step for preparing a second rod that extends in the second direction, and deforms and conforms to a shape of the object, and imparting tension outward in the second direction to the second rod; a second pressing step for lowering the second rod downward and pressing the film against the object; and a second moving step for moving the second rod in the first direction. In such a method, the first moving step may include applying the film to a roof of the object, and the second moving step may include applying the film to a side wall of the object.

With a film application method according to another aspect, the second moving step may include moving the pressure roller with the second rod while pressing the second rod against the object front the first direction.

A film application method according to another aspect may further include a frame body preparing step for preparing a frame body, at a position more to the outer periphery side than the object, that supports the peripheral edge of the film.

With a film application method according to another aspect, in the first moving step, the frame body may be capable of deforming so as to correspond to a curving shape at an application location of the object.

Advantageous Effects of Invention

According to the present invention, a film can be applied to both locations where the sloping angle is moderate and locations where the sloping angle is great in the object.

BRIEF DESCRIPTION OF DRAWINGS

FIGS. 5A and 5B are schematic drawings illustrating detailed configurations of a second film application unit.

DESCRIPTION OF EMBODIMENT

Figure 1:
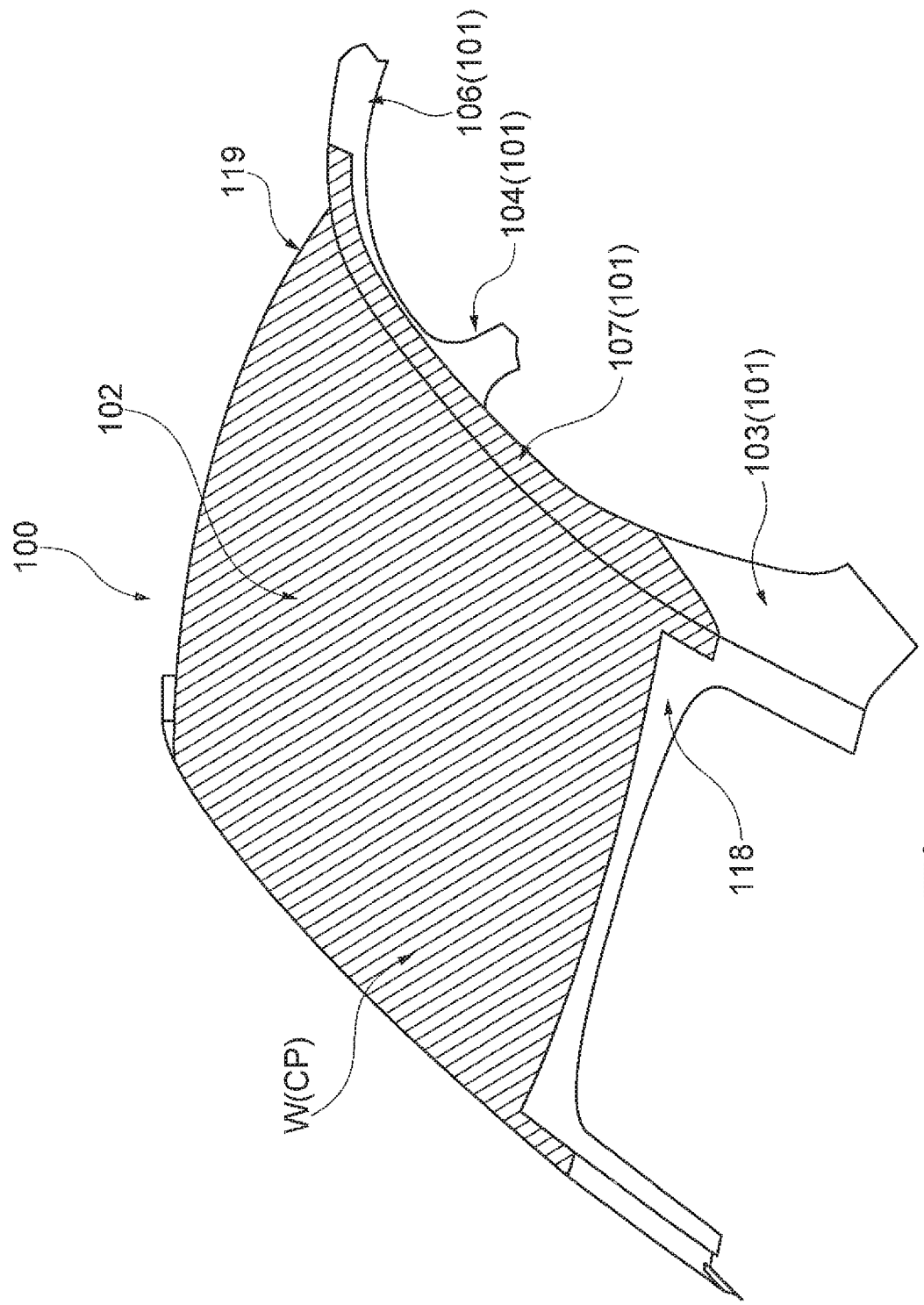
FIG. 1 is a perspective view illustrating a vehicle to which a film has been applied using a film application device according to an embodiment of the present invention.

An embodiment of the present invention will be described in detail while referencing the attached drawings. Note that in the following description, the same reference characters are used for components that are the same as or equivalent to one another, and redundant descriptions of these components will be omitted.

FIG. 1 is a perspective view illustrating a vehicle to which a film has been applied using a film application device according to the present embodiment. As illustrated in FIG. 1, a vehicle 100, which is the object to which the film is to be applied, includes side walls 101 and a roof 102. A film W covers a covered region CP that includes, of the vehicle 100, the roof 102 where a sloping angle is comparatively moderate and at least a portion of the top edge sides of the side walls 101 where the sloping angle is comparatively great. Note that the term "sloping angle" refers to the angle between a horizontal plane and the surface of the object to which the film is to be applied. In FIG. 1, the portion of the vehicle 100 that is covered by the film W is indicated by the hatching. The vehicle 100 includes the roof 102, rear pillars 103 that extend rearward from the roof 102, center pillars 104 that extend downward from the center of the roof 102 in the front-back direction, front pillars 106 that extend forward from the roof 102, a frame 118 for attaching a rear window in a region surrounded by the roof 102 and the rear pillars 103, and a frame 119 for attaching a windshield in a region surrounded by the roof 102 and the front pillars 106. Together, the rear pillars 103, the center pillars 104, and the front pillars 106 form the side walls 101. The side walls 101 also include upper edges 107 that bend downwards from the side edges of the roof 102, and doors (see FIG. 2). The upper edges 107 are formed between the roof 102 and the top edges of the doors. Moreover, the doors include front doors and rear doors. In the horizontal direction, the rear pillars 103 are formed along the rear sides of the rear doors, the front pillars 106 are formed along the front sides of the front doors, and the center pillars 104 are formed between the rear doors and the front doors. In the present embodiment, the film W is applied to a portion of the top edge sides of the rear pillars 103 and the front pillars 106 and to the upper edges 107 of the side walls 101. However, the film W may be applied to at least one of the rear pillars 103 and the front pillars 106, and the film W may also be applied to the center pillars 104.

Figure 2:
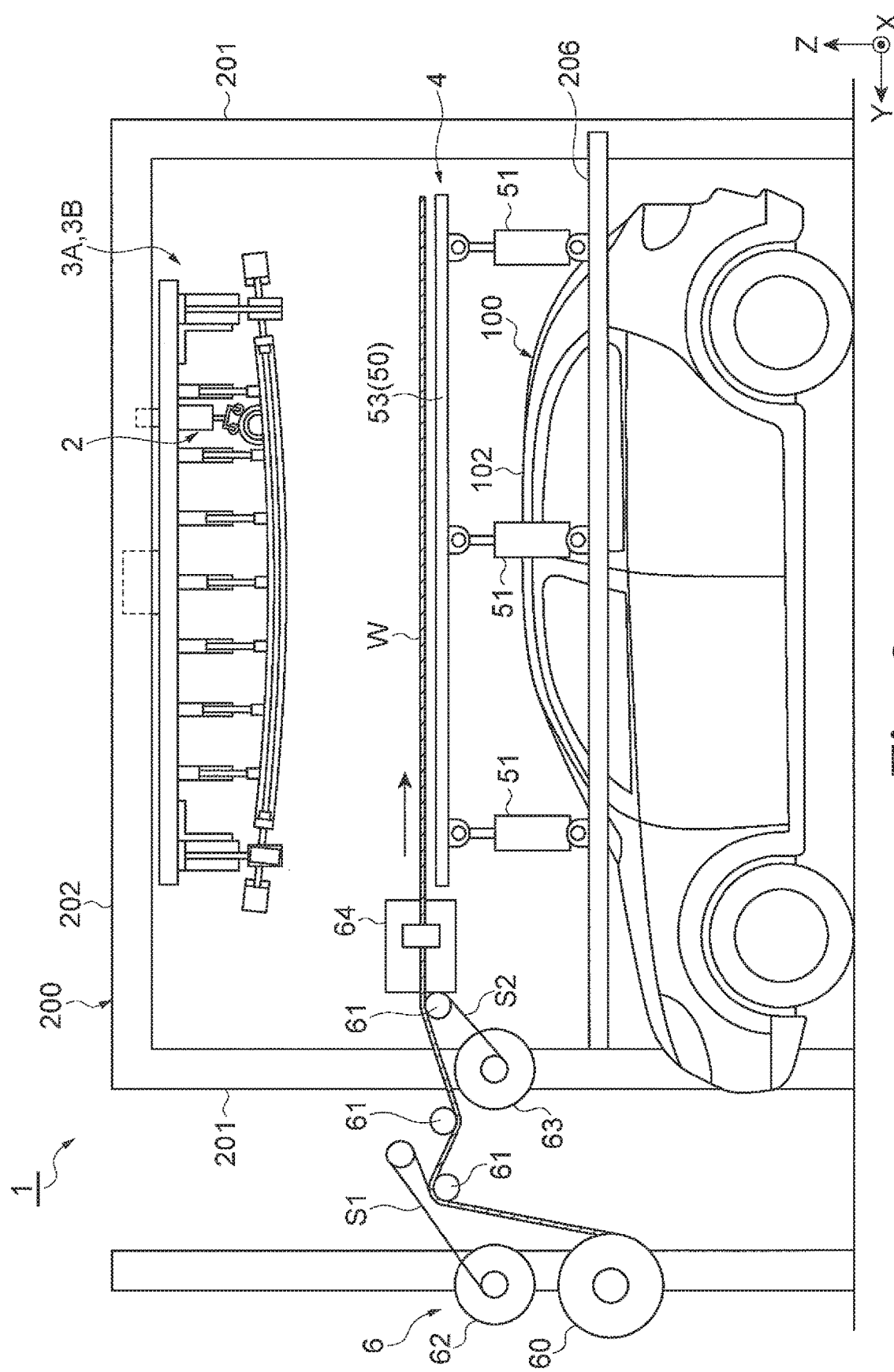
FIG. 2 is a side view illustrating the film application device according to the present embodiment.
Figure 3:
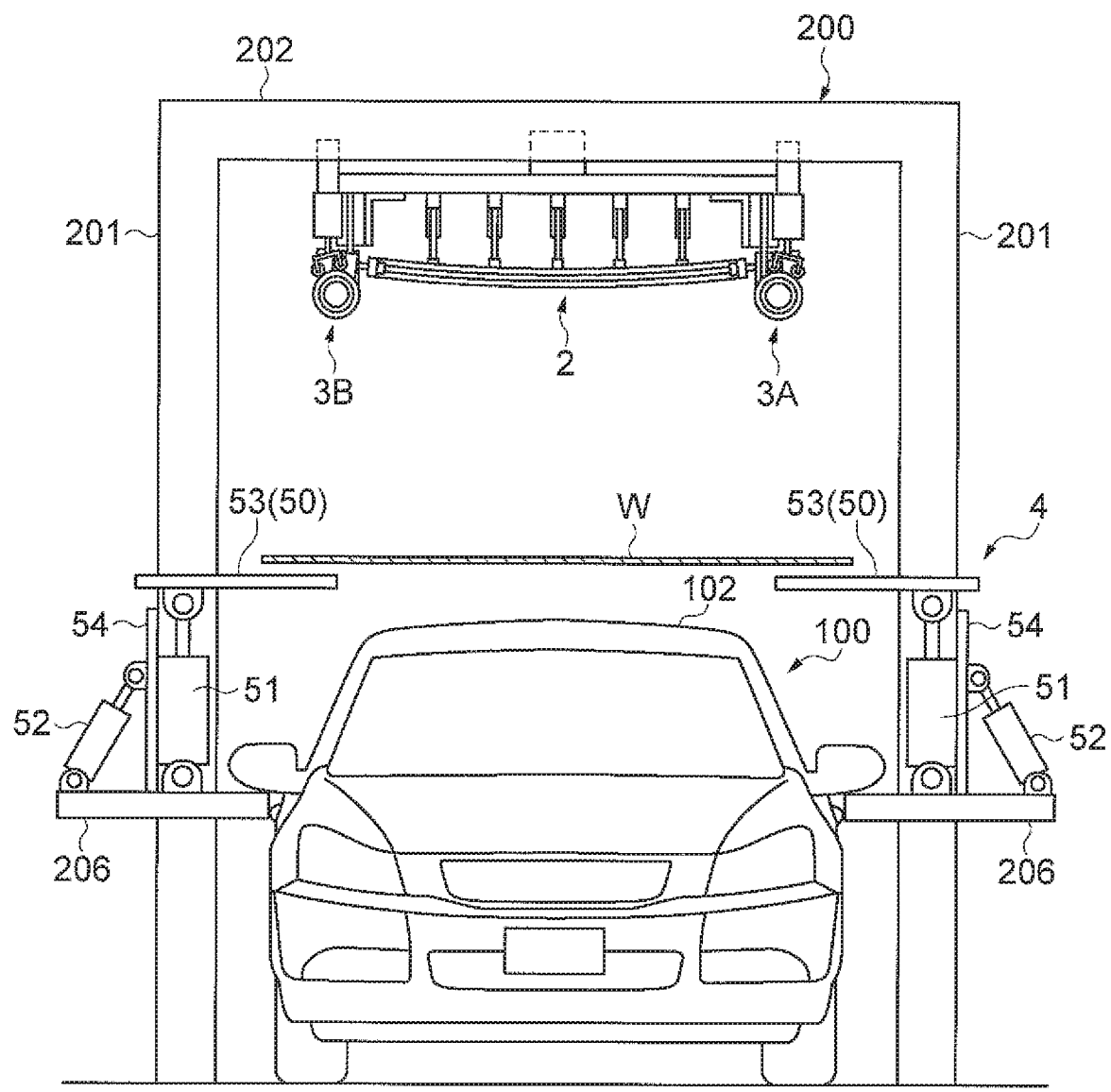
FIG. 3 is a front view illustrating the film application device according to the present embodiment.

FIG. 2 is a side view illustrating the film application device according to the present embodiment. FIG. 3 is a front view of the film application device according to the present embodiment. As illustrated in FIGS. 2 and 3, a film application device 1 includes a first film application unit 2, second film application units 3A and 3B, a film supporting unit 4, and a film supply unit 6. At a time of film application, the vehicle 100 is disposed within a support frame 200 for supporting the various mechanisms. The support frame 200 includes pillars 201 in the four corners, and a ceiling portion 202 provided on the upper ends of the pillars 201. In the present specification, when based on the posture of the vehicle 100 at the time of film application, a width direction among horizontal directions of the vehicle 100 is defined as an X-axis direction (a first direction), a front and back direction among horizontal directions of the vehicle 100 is defined as a Y-axis direction (a second direction), and a vertical direction is defined as a Z-axis direction. A first side (the right side in FIG. 3) in the width direction of the vehicle 100 is defined as a positive side in the X-axis direction, and a second side (the left side in FIG. 3) is defined as a negative side in the X-axis direction. A front side of the vehicle 100 is defined as a positive side in the Y-axis direction, and a rear side is defined as a negative side in the Y-axis direction.

Figure 4A:
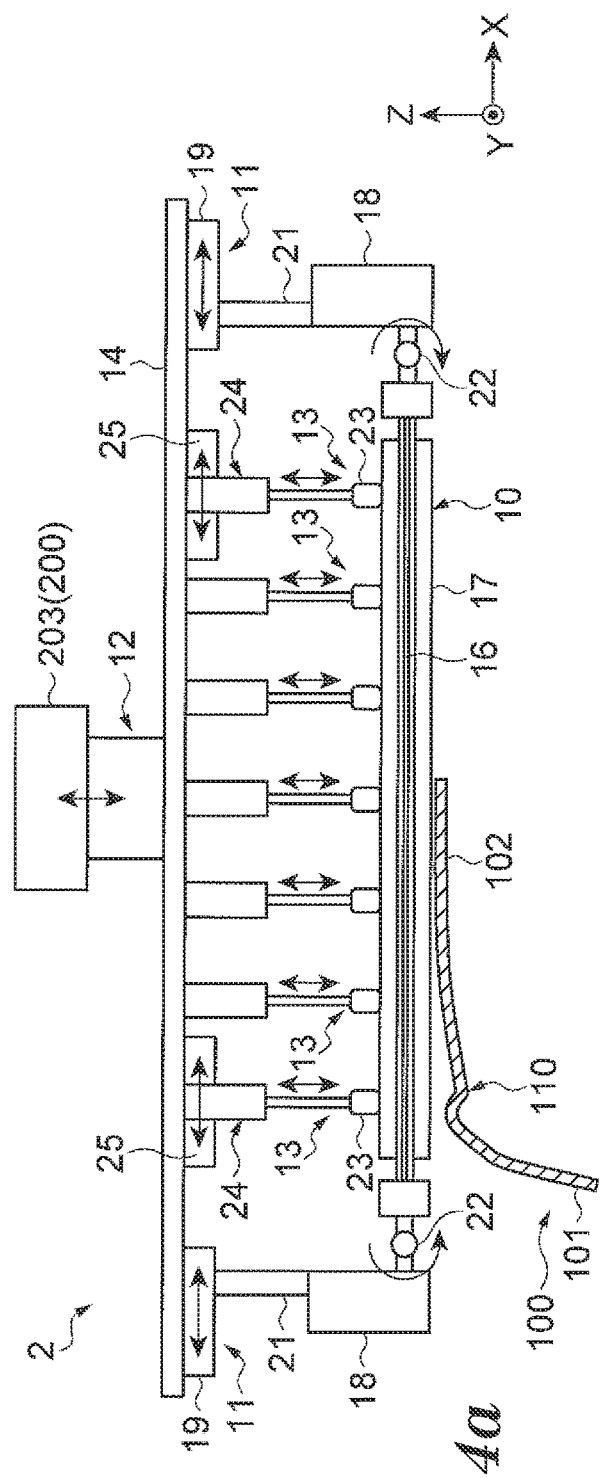
FIGS. 4A and 4B are schematic drawings illustrating detailed configurations of a first film application unit.
Figure 4B:
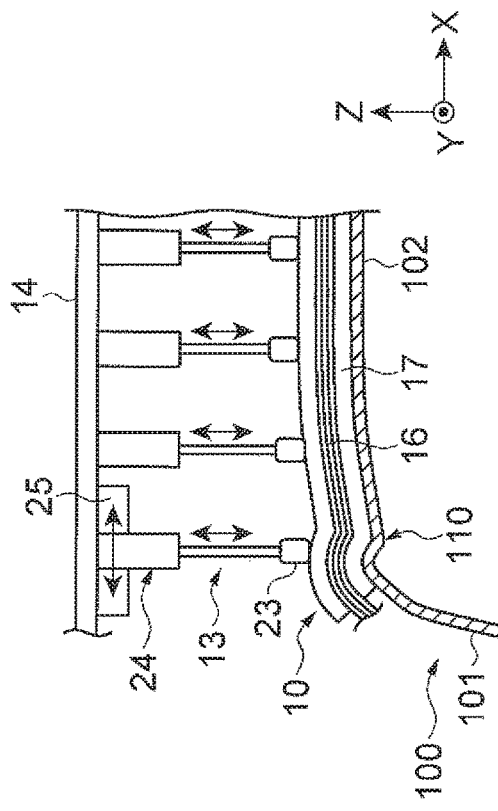

FIGS. 4A and 4B are schematic drawings illustrating detailed configurations of the first film application unit 2. As illustrated in FIG. 4A, the first film application unit 2 includes a first rod 10, first tensioning parts 11, a first movement part 12, and first pressing parts 13. The first tensioning parts 11, the first movement part 12, and the first pressing parts 13 are supported by a rod-like support member 14 that extends in the X-axis direction.

The first rod 10 extends in the X-axis direction and presses on the film W, which is disposed above the vehicle 100, from the upper side, deforms and conforms to the shape of the vehicle 100, and moves in the Y-axis direction. That is, as illustrated in FIG. 4B, the first rod 10 has a flexible configuration that deforms so as to match the shape of the vehicle 100. The first rod 10 includes a core portion 16 that extends in the X-axis direction, and an application portion 17 disposed on an outer periphery side of the core portion 16. The core portion 16 is a cylindrical member that extends in the X-axis direction. A member with a Shore A hardness of 60 to 90 is preferably used for the core portion 16. That is, the Shore A hardness of the core portion 16 is preferably not less than 60 or not less than 70. As a result of this configuration, when tension is applied to the core portion 16 by the tensioning parts, the first rod 10 can have a degree of rigidity whereby a given shape thereof can be maintained. On the other hand, the Shore A hardness of the core portion 16 is preferably not greater than 90 or not greater than 80. As a result of this configuration, a degree of flexibility can be imparted to the first rod 10 whereby the first rod 10 is capable of deforming so as to conform to the shape of the vehicle 100. Examples of materials that have such a Shore A hardness include chloroprene (CR), nitrile (NBR), and similar rubber materials, and such may be used as the core portion 16. A diameter of the core portion 16 may be set to approximately 6 to 30 mm. By setting the diameter of the core portion 16 to not less than 6 mm, the mechanical design of the joint portions can be simplified; and by setting the diameter to not greater than 30 mm, the flexibility of the first rod 10 can be ensured.

The application portion 17 is disposed on the outer periphery side of the core portion 16, and the hardness thereof is lower than at least that of the core portion 16. The application portion 17 is the portion that comes in contact with the film W when applying the film W. The application portion 17 preferably has a surface for applying the film W to the object surface and, while a cross-sectional shape thereof is not limited, a cylindrical member with the core portion 16 disposed in the center thereof can be used. A spongy member with a Shore B hardness of 20 to 50 is preferably used for the application portion 17. That is, the Shore B hardness of the application portion 17 is preferably not greater than 50 or not greater than 40. As a result of this configuration, excellent conformability of the application portion 17 to the shape of the vehicle 100 can be ensured. On the other hand, the Shore B hardness of the application portion 17 is preferably not less than 20 or not less than 30. As a result of this configuration, a degree of elasticity, whereby first pressure rollers 23 can control the operations of the first rod 10, can be maintained. Examples of materials that have such a Shore B hardness include porous EPDM, CR rubber, and similar sponge rubbers. An external diameter of the application portion 17 is preferably from 50 to 100 mm. The external diameter of the application portion 17 is preferably set to not less than 50 mm so as to be larger than the diameter of the core portion 16. On the other hand, rubber with a diameter greater than 100 mm is problematic to manufacture and is difficult to procure and, thus, the external diameter of the application portion 17 is preferably set to not greater than 100 mm. Lengths in the X-axis direction of the core portion 16 and the application portion 17 may be longer than the size in the X-axis direction of the vehicle 100. The core portion 16 is longer than the application portion 17. Portions of the core portion 16 are exposed from both ends of the application portion 17.

The first tensioning parts 11 impart tension outward in the X-axis direction to at least one end side in the X-axis direction of the first rod 10. In the present embodiment, the first tensioning parts 11 are provided at both end sides of the first rod 10. The first tensioning parts 11 include a support part 18 that supports an end portion of the first rod 10, a drive unit 19 capable of moving the support part 18 in the X-axis direction, and a coupling part 21 that links the drive unit 19 and the support part 18.

The support part 18 is disposed outward of the first rod 10 in the X-axis direction so as to be opposite a tip portion of the first rod 10. The support part 18 and the first rod 10 are connected via a universal joint 22. The universal joint 22 is a joint that allows the angle of the two members to freely change. As a result of this configuration, the first rod 10 can freely deform while being supported by the support part 18.

The drive unit 19 is provided on the support member 14, and call move the support part 18 and the coupling part 21 in the X-axis direction along the support member 14. The drive unit 19 is constituted of a servomotor or the like. As a result of this configuration, the drive unit 19 moves the support part 18 in the X-axis direction and, as such, the position of the end portion of the first rod 10 also moves. That is, when the drive unit 19 moves the support part 18 outward in the X-axis direction relative to the first rod 10, the tension imparted to the first rod 10 increases. On the other hand, when the drive unit 19 moves the support part 18 inward in the X-axis direction relative to the first rod 10, the tension imparted to the first rod 10 decreases.

The first movement part 12 moves the first rod 10 in the vertical direction. In the present embodiment, the first movement part 12 is constituted by a servomotor provided on a top surface side of the support member 14, at a central position in the X-axis direction of the support member 14. The first movement part 12 is connected to a guide rail 203 of the support frame 200. The first movement part 12 can move the first tensioning parts 11 and the entire first rod 10 in the vertical direction by moving the support member 14 in the vertical direction. As a result of this configuration, the first movement part 12 can adjust the position in the vertical direction of the first rod 10, and the first rod 10 can be deformed to a shape conforming to the roof 102 and the side wafts 101 of the vehicle 100. Note that the first movement part 12 need not be capable of moving the entire first rod 10 in the vertical direction and, for example, a configuration is possible in which the first movement part 12 can move only the end portions of the first rod 10. Additionally, the first movement part 12 can move the entire support member 14 in the Y-axis direction along the guide rail 203. As a result of this configuration, the first movement part 12 can move the first rod 10, the first tensioning parts 11, and the first pressing part 13 in the Y-axis direction.

The first pressing parts 13 include a first pressure roller 23 and a cylinder 24. The first pressure roller 23 moves with the first rod 10 while pressing the first rod 10 against the vehicle 100. An upper end of the cylinder 24 is connected to the support member 14, and a lower end is connected to the first rod 10. Accordingly, the pressing force of the first pressure roller 23 is adjusted by elongating or contracting the cylinder 24. The first pressing parts 13 are provided in plurality at a constant spacing in the X-axis direction. Here, a drive unit 25 that moves the first pressure roller 23 and the cylinder 24 in the X-axis direction is provided on the first pressing parts 13 on both end sides in the X-axis direction of the plurality of first pressing parts 13. As a result of this configuration, the positions of the first pressing parts 13 at both end sides can be adjusted in the X-axis direction so that the first pressure roller 23 can constantly press on a laser weld 110. The other first pressing parts 13 need not have the drive unit 25.

Figure 6A:
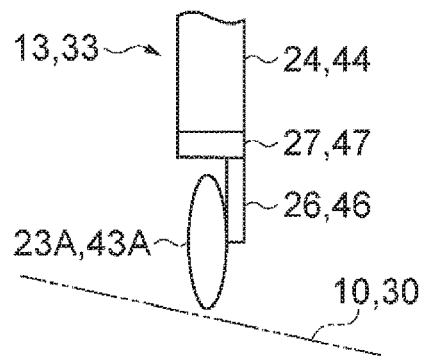
FIGS. 6A to 6C are drawings illustrating configurations of pressure rollers.
Figure 6B:
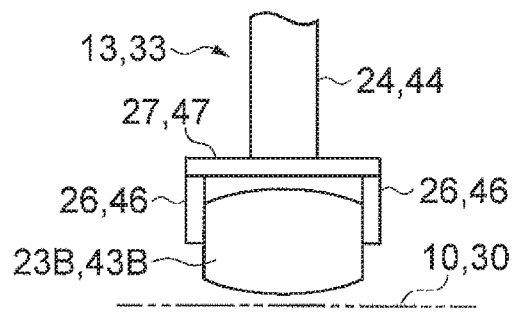
Figure 6C:
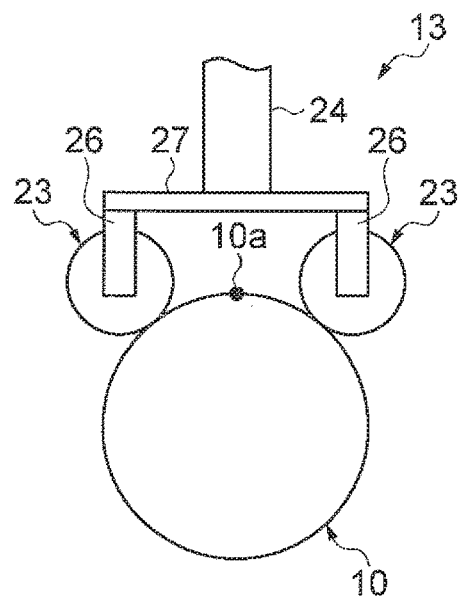

As illustrated in FIG. 6C, the first pressing parts 13 include a pair of the first pressure rollers 23 arranged so as to saddle the first rod. 10 on both sides in the Y-axis direction. That is, with the upper end 10a of the first rod 10 in the middle, one first pressure roller 23 is in contact with one side of the first rod 10, and one first pressure roller 23 is in contact with the other side of the first rod 10. Each of the pair of first pressure rollers 23 is in contact with the first rod 10 at a position substantially the same distance from an upper edge 10a of the first rod 10. Note that the pair of first pressure rollers 23 are linked together via a coupling member 27. The coupling member 27 is connected to each of the first pressure rollers 23 via a rotating shaft support part 26. The lower end of the cylinder 24 is connected to a top surface of the coupling member 27. Here, when viewed from an axial direction of the first pressure roller 23, the cylinder 24 is connected to a central position of the coupling member 27. Note that the number of first pressure rollers 23 is not limited and may be one, two, or more.

Here, of the plurality of first pressing parts 13, the first pressing parts 113 on the outer sides in the X-axis direction include first pressure rollers 23A such as that illustrated in FIG. 6A. At these positions, the roof 102 of the vehicle 100 curves and, as a result, slopes so as to fall outward in the X-axis direction. On the other hand, of the plurality of first pressing parts 13, the first pressing parts 13 on the inner side in the X-axis direction include first pressure rollers 23B such as that illustrated in FIG. 6B. At these positions, the roof 102 of the vehicle 100 does not slope compared to the roof 102 at positions outward in the X-axis direction. The first pressure rollers 23A are configured to have a smaller dimension in the axial direction than that of the first pressure rollers 23B. Additionally, while the first pressure rollers 23B are supported by the rotating shaft support parts 26 from both sides in the axial direction, the first pressure rollers 23A are supported by the rotating shaft support parts 26 from only one side in the axial direction. Additionally, the rotating shaft support parts 26 that support the first pressure rollers 23A are disposed on the side that becomes lower due to the sloping of the roof 102 of the vehicle. For example, if the first pressure roller 23B illustrated in FIG. 6B presses on a roof 102 with a large slope, one of the rotating shaft support parts 26 may come in contact with the first rod 10. On the other hand, if the cantilevered first pressure roller 23A with a small width is used, contact between the rotating shaft support parts 26 and the first rod 10 can be avoided when pressing on a roof 102 with a large slope. Note that a configuration is possible in which, of the plurality of first pressing parts 13, only the first pressing parts 13 disposed outermost in the X-axis direction have the first pressure rollers 23A, and the other first pressing parts 13 have the first pressure rollers 23B. However, a configuration is also possible in which a plurality of the first pressing parts 13, counted from the outermost sides in the X-axis direction, have the first pressure rollers 23A.

Figure 8A:
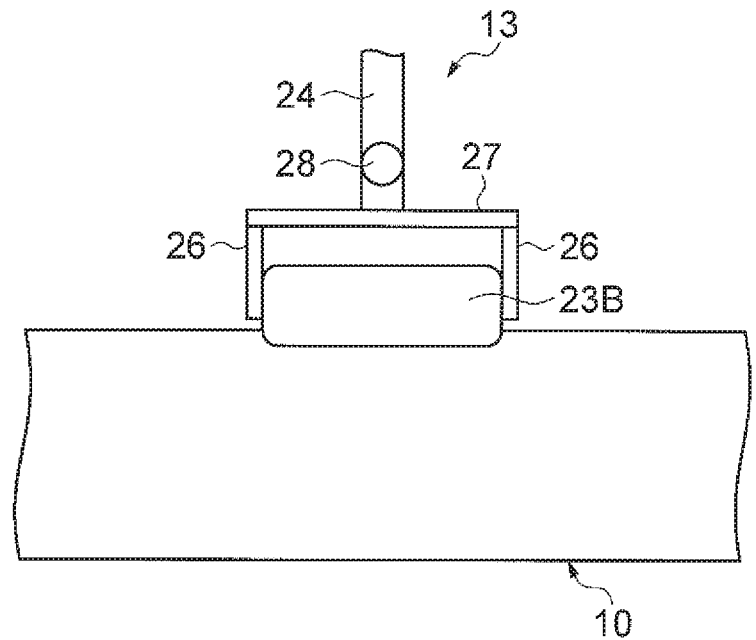
FIGS. 8A and 8B are drawings illustrating configurations of a first pressing part.
Figure 8B:
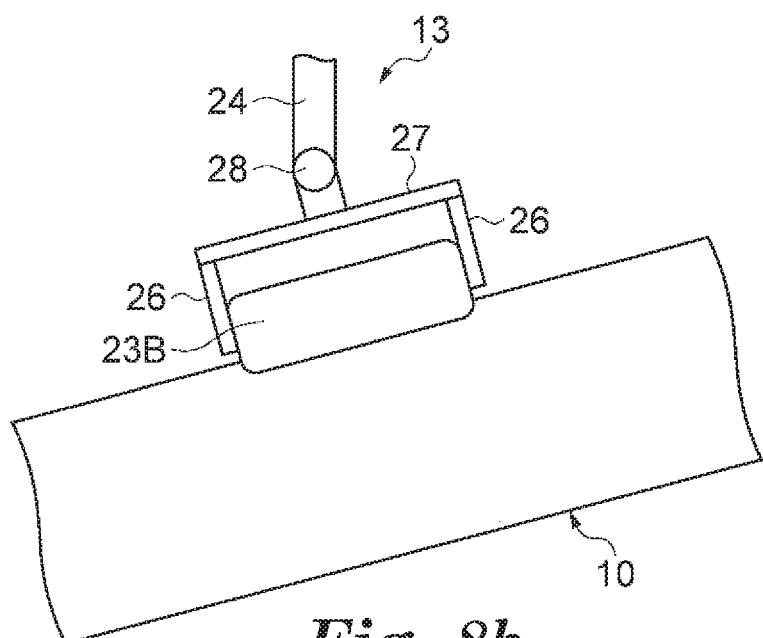

Additionally, the first pressing parts 13 may have a mechanism capable of changing an angle of inclination of the rotating shaft of the first pressure rollers 23 with respect to the horizontal direction, when viewed from the Y-axis direction. Specifically, as illustrated in FIGS. 8A and 8B, a rotating mechanism 28 may be provided near the bottom end portion of the rod of the cylinder 24 of the first pressing parts 13. The rotating mechanism 28 has a rotating shaft that extends in the Y-axis direction, and is a mechanism for rotating, the first pressure roller 23B about this rotating shaft (see FIG. 8B). As a result of this configuration, the first pressing parts 13 can more easily cause the first rod 10 to incline in the extending direction (the X-axis direction), leading to improvement in the conformability of the first rod 10 to the roof 102 of the vehicle 100.

FIGS. 5A and 5B are schematic drawings illustrating detailed configurations of a second film application unit 3B. As illustrated in FIG. 5A, the second film application unit 3B includes a second rod 30, second tensioning parts 31, a second movement part 32, and second pressing parts 33. The second tensioning parts 31, the second movement part 32, and the second pressing parts 33 are supported by a rod-like support member 34 that extends in the Y-axis direction.

The second rod 30 extends in the Y-axis direction and presses on the film W, which is disposed above the vehicle 100, from the upper side, deforms and conforms to the shape of the vehicle 100, and moves in the X-axis direction. That is, as illustrated in FIG. 5B, the second rod 30 has a flexible configuration that deforms so as to match the shape of the vehicle 100. The second rod 30 includes a core portion 36 that extends in the Y-axis direction, and an application portion 37 disposed on an outer periphery side of the core portion 36. Note that except for the extending direction, the second rod 30 has a configuration to the same effect as the first rod 10 and, as such, detailed description thereof is omitted.

The second tensioning parts 31 impart tension outward in the Y-axis direction to at least one end side in the Y-axis direction of the second rod 30. In the present embodiment, the second tensioning parts 31 are provided at both end sides of the second rod 30. The second tensioning parts 31 include a support part 38 that supports an end portion of the second rod 30, a drive unit 39 capable of moving the support part 38 in the Y-axis direction, and a coupling part 41 that links the drive unit 39 and the support part 38. Note that except for the direction in which tension is imparted, the second tensioning parts 31 have a configuration to the same effect as the first tensioning parts 11 and, as such, detailed description thereof is omitted.

The support part 38 is disposed outward of the second rod 30 in the Y-axis direction so as to be opposite a tip portion of the second rod 30. The support part 38 and the second rod 30 are connected via a universal joint 42. The universal joint 42 is a joint that allows the angle of the two members to freely change. As a result of this configuration, the second rod 30 can freely deform while being supported by the support part 38.

The second movement part 32 moves the second rod 30 in the vertical direction. Additionally, the second movement part 32 can move the entire support member 34 in the X-axis direction along the guide rail 204. The second movement part 32 moves the second rod 30 at the positions of the edge portion of the roof 102 and the side walls 101 of the vehicle 100. Except for the movement direction, the second movement part 32 has a configuration to the same effect as the first movement part 12 and, as such, detailed description thereof is omitted.

The second pressing parts 33 include a second pressure roller 43 and a cylinder 44. The second pressure roller 43 moves with the second rod 30 while pressing the second rod 30 against the vehicle 100. An upper end of the cylinder 44 is connected to the support member 34, and a lower end is connected to the second rod 30. Accordingly, the pressing force of the second pressure roller 43 is adjusted by elongating or contracting the cylinder 44. The second pressing parts 33 are provided in plurality at a constant spacing along the Y-axis direction.

Figure 7A:
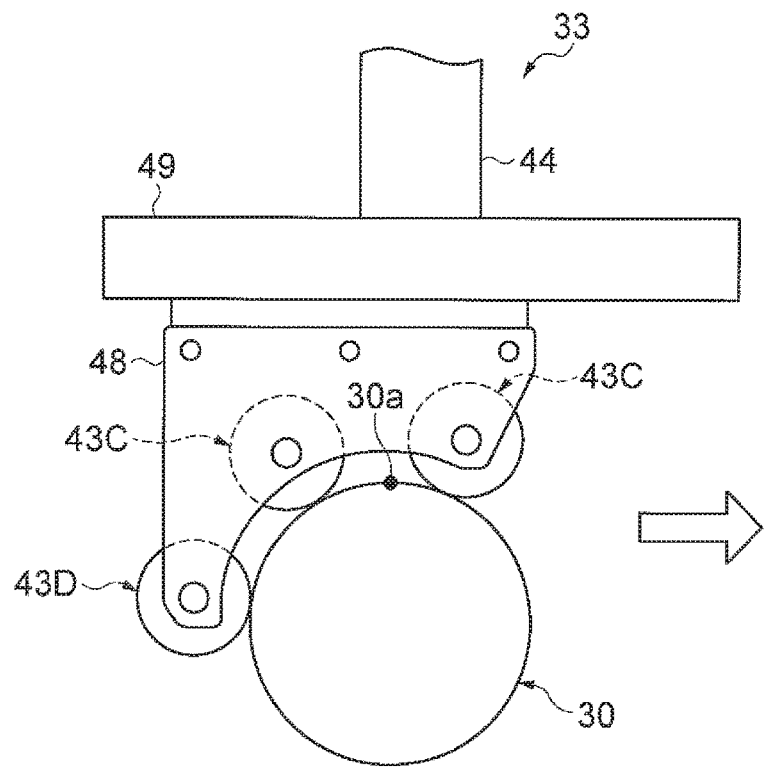
FIGS. 7A and 7B are drawings illustrating configurations of a second pressing part.
Figure 7B:
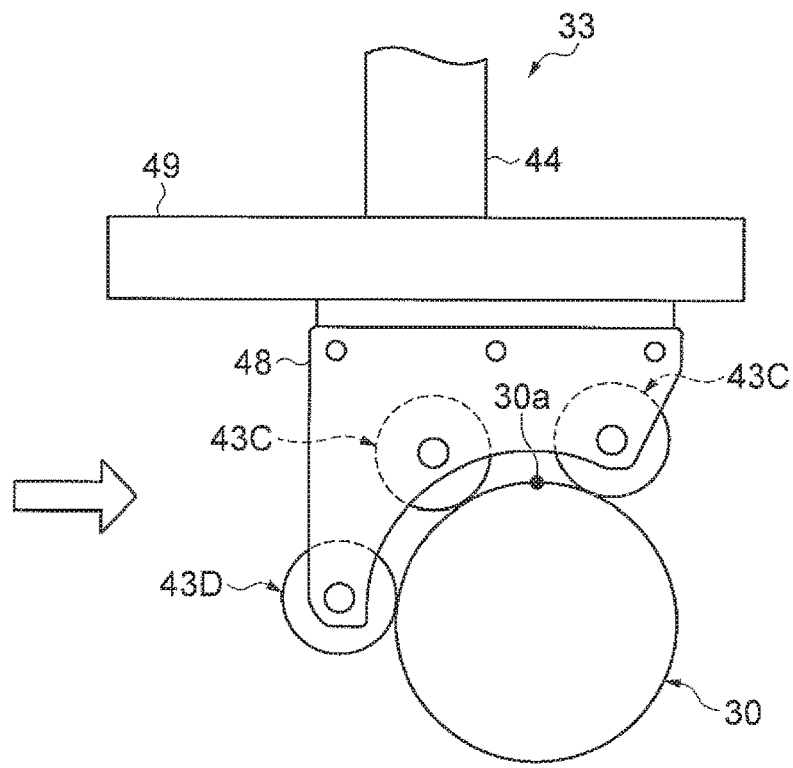

As illustrated in FIGS. 7A and 7B, each of the second pressing parts 33 includes a pair of the second pressure rollers 43C and 43D, arranged so as to saddle the second rod 30 on both sides in the X-axis direction. That is, with the upper end 30a of the second rod 30 in the middle, one second pressure roller 43C is in contact with one side of the second rod 30, and one second pressure roller 43D is in contact with the other side of the second rod 30. Each of the pair of second pressure rollers 43C is in contact with the second rod 30 at a position substantially the same distance from an upper end 30a of the second rod 30. The pair of second pressure rollers 43C is supported by a plate-like rotating shaft support part 48. The plate-like rotating shaft support part 48 simultaneously supports the pair of second pressure rollers 43C and a second pressure roller 4D (described later) with a single plate. Additionally, the rotating shaft support part 48 is supported by a slider 49. The slider 49 can move the rotating shaft support part 48 in the X-axis direction with the pair of the pressure rollers 43C. The lower end of the cylinder 44 is connected to a top surface of the slider 49. Here, when viewed from an axial direction of the second rod 30, the cylinder 44 is connected to a central position of the cylinder 44.

The second pressing parts 33 further include a second pressure roller 43D that presses the vicinity of an edge portion in the horizontal direction of the second rod 30. The second pressure roller 43D is supported by a portion of the rotating shaft support part 48 that extends downward. The second pressure roller 43D is capable of pressing the second rod 30 toward the X-axis direction, against the film W and the vehicle 100. The second pressure roller 43D can be pressed to the vehicle 100 side due to the slider 49 moving the rotating shaft support part 48.

Here, of the plurality of second pressing parts 33, the second pressing parts 33 on the outer sides in the Y-axis direction include second pressure rollers 43A such as that illustrated in FIG. 6A. At these positions, the roof 102 of the vehicle 100 curves and, as a result, slopes so as to fall outward in the Y-axis direction. On the other hand, of the plurality of second pressing, parts 33, the second pressing parts 33 on the inner side in the Y-axis direction include second pressure rollers 43B such as that illustrated in FIG. 6B. The second pressure rollers 43A and the second pressure rollers 43B are applied to the same effect as the first pressure rollers 23A and the first pressure rollers 23B and, as such, description thereof is omitted.

Figure 16:
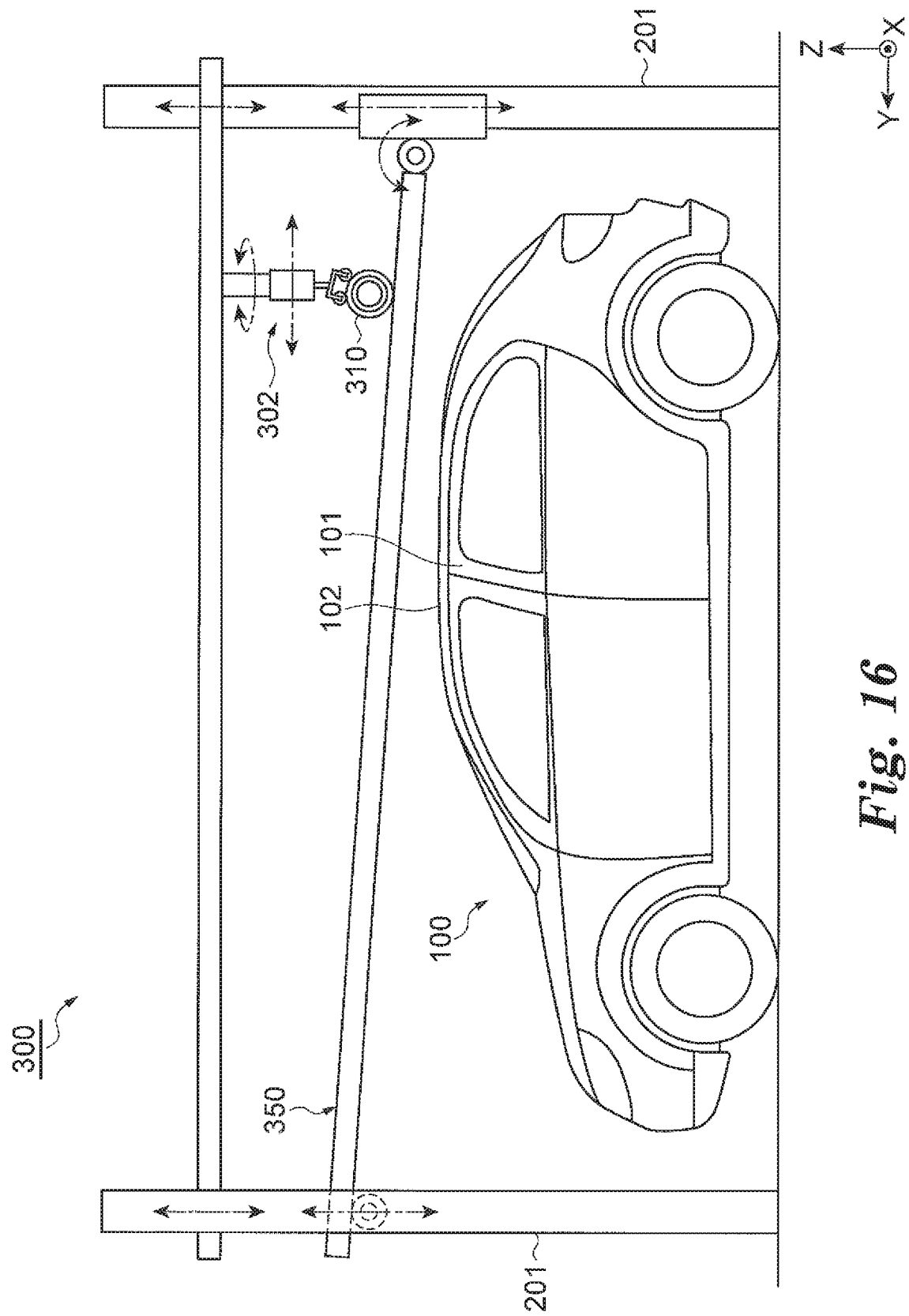
FIG. 16 is a drawing illustrating a film application device according to a modified example.
Figure 17:
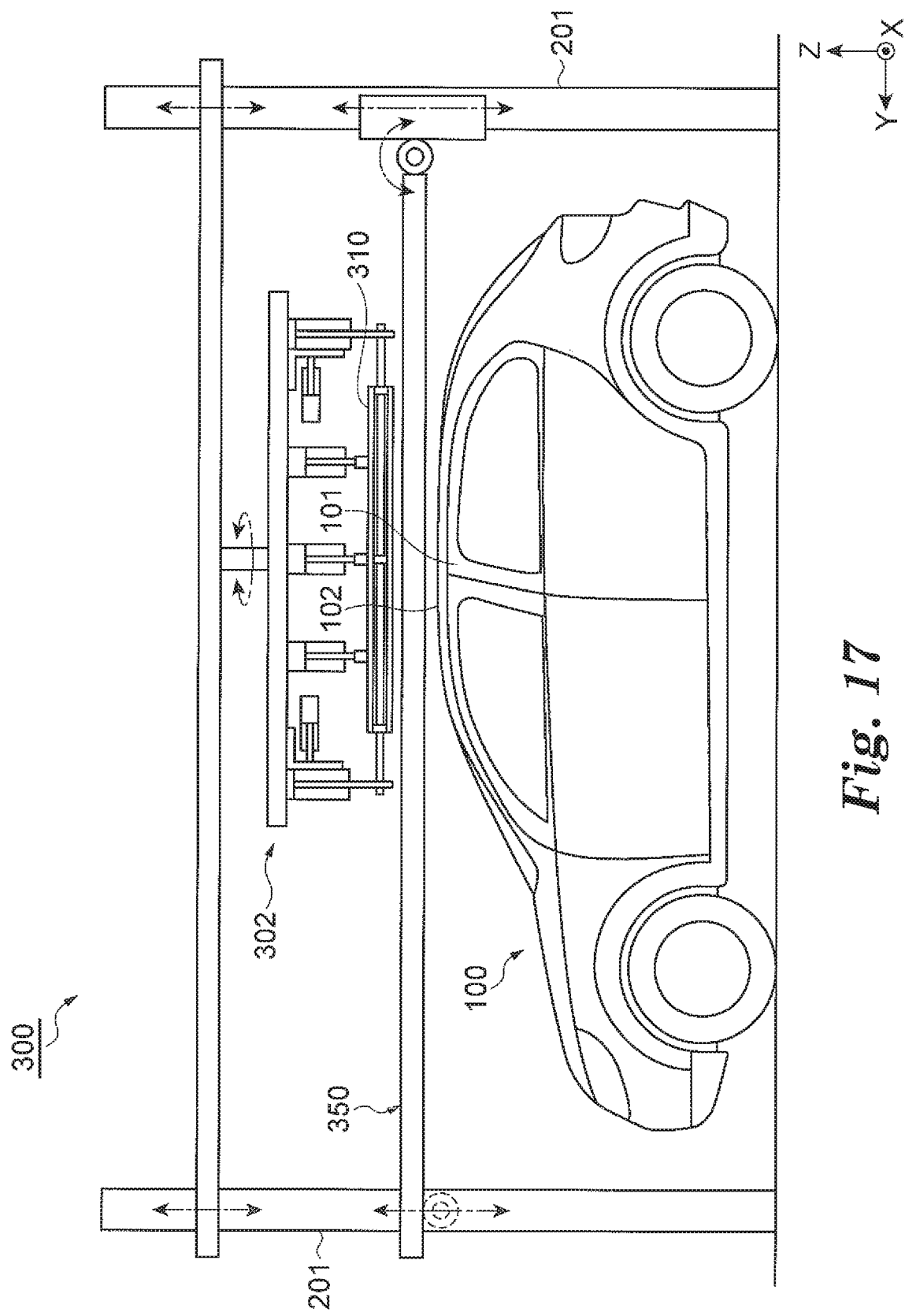
FIG. 17 is a drawing illustrating a film application device according to a modified example.

As described above, the second film application unit 3B includes the second rod 30 that presses the film W in the vicinity of the edge portion on the negative side in the X-axis direction of the roof 102 of the vehicle 100. Another second film application unit 3A is provided so as to form a pair with the second film application unit 3B and sandwich the vehicle 100. The second film application unit 3A includes a second rod 30 that presses on the film W in the vicinity of the edge portion on the positive side in the X-axis direction of the roof 102 of the vehicle 100. Note that except for the position of the second rod 30 and that the advancing direction in the X-axis direction is the opposite direction, the second film application unit 3A has a configuration to the same effect as the second film application unit 3B and, as such, description thereof is omitted. Thus, the film application device 1 may include a total of three rods, namely, one of the first rod 10 and two of the second rods 30. As a result of this configuration including three rods, application can be performed simultaneously by the pair of second rods 30 to the side walls 101 on both sides of the vehicle 100. Therefore, application time can be shortened. Additionally, compared to a case where the film W is applied to the side walls 101 on both sides by moving and rotating a single rod, the movement mechanism of the rods can be simplified and the mechanical design can be simplified. Note that, as illustrated in FIGS. 16 and 17 (described later), the film W may be applied to the side surfaces of the vehicle 100 by moving a single rod and rotating this single rod 90 degrees.

As illustrated in FIGS. 2 and 3, the film supporting unit 4 is a mechanism that disposes the film W above the vehicle 100. The film supporting unit 4 includes, at a position more to an outer periphery side than the vehicle 100, a frame body 50 that supports the peripheral edge of the film W, and drive units 51 and 52 that drive the frame body 50. Specifically, the frame body 50 includes a pair of plate-like members 53 disposed on both sides in the X-axis direction with respect to the vehicle 100, and a pair of plate-like members (not illustrated) disposed on both sides in the Y-axis direction with respect to the vehicle 100. Note that in FIG. 3 and drawings corresponding thereto, the plate-like members and the drive units disposed on both sides in the Y-axis direction are omitted. The plate-like members 53 widen on the X-Y plane at a height position in the vicinity of the roof 102 of the vehicle 100, and extend in the Y-axis direction. The plate-like members 53 are constituted of a flexible material such as stainless steel or a similar metal plate, or the like, with a thickness of 1 to 3 mm.

The drive units 51 are mechanisms that drives the plate-like members 53 in the vertical direction. The drive units 51 are constituted of a cylinder that extends in the vertical direction. Upper ends of the drive units 51 are fixed to a bottom surface of the plate-like members 53, at an edge portion of an outer side in the X-axis direction and lower ends of the drive units 51 are fixed to pedestal portions 206 of the support frame 200. Additionally, a plurality of the drive units 51 are provided for each of the plate-like members 53. For example, in a case where three of the drive units 51 are provided, the drive units 51 are disposed so as to be separate from each other at a predetermined spacing in the Y-axis direction. A first drive unit 51 is disposed at a front end portion of the plate-like member 53, a second drive unit 51 is disposed at substantially a central position in the Y-axis direction of the plate-like member 53, and a third drive unit 51 is disposed at a back end portion of the plate-like member 53. However, the number and positions of the drive units 51 are not particularly limited. That is, the number of the drive units 51 may be greater than three. For example, the number of the drive units 51 may be five. Each of the drive units 51 is independent from the other drive units 51 and is capable of elongating and contracting. Accordingly, the plate-like members 53 move vertically in part at the locations where each of the drive units 51 is provided. As such, the frame body 50 is capable of adjusting the distance between the film W and the vehicle 100 at the start of the application of the film W Additionally, the frame body 50 is capable of curving corresponding to the curving shape of the vehicle 100. Furthermore, when applying the film W to the vehicle 100 using the first rod 10, the frame body 50 can deform so as to conform to the curving shape at the application location of the vehicle 100.

The drive units 52 (not illustrated in FIG. 2) are mechanisms that drive the plate-like members 53 in the X-axis direction. The drive units 52 are constituted of a cylinder that extends so as to incline upward and inward in the X-axis direction. Upper ends of the drive units 52 are fixed to a coupling member 54 linked to the drive unit 51, and lower ends of the drive units 52 are fixed to the pedestal portions 206. The number of drive units 52 per plate-like member 53 is not particularly limited. Additionally, the drive units 52 may be disposed without an inclination so as to extend straight in the X-axis direction. By contracting the drive units 52, the plate-like member 53 is pulled outward in the X-axis direction (see FIG. 10). As a result, the frame body 50 can impart tension outward in the planar direction to the film W. Note that when imparting tension to the film W, the opposing plate-like members in the Y-axis direction (not illustrated) can also pull the film W outward in the Y-axis direction.

As illustrated in FIG. 2, the film supply unit 6 is a mechanism that supplies the film W to the frame body 50. The film supply unit 6 includes a roller part 60, a plurality of guide rollers 61, protective sheet recovery rollers 62 and 63, and a positioning unit 64. The roller part 60 feeds out the film W that is wound in a roll manner. The plurality of guide rollers 61 guides the film W that is fed out from the roller part 60. The protective sheet recovery roller 62 takes up a protective sheet S1 peeled from a top surface of the fed out film W. The protective sheet recovery roller 63 takes up a protective sheet S2 peeled from a bottom surface of the fed out film W. The positioning unit 64 performs positioning of the film W at a location ahead of the frame body 50. Additionally, a leading edge portion of the film W supplied from the positioning unit 64 is transported to the negative side in the Y-axis direction while being gripped by a gripping mechanism (not illustrated). When the leading edge portion of the film W reaches the edge portion on the negative side in the Y-axis direction of the frame body 50, both edge portions of the film. W are applied to the top surfaces of the plate-like members 53 on both sides of the frame body 50. Additionally, the film W is cut at a location on the positive side in the Y-axis direction of the frame body 50.

Next, procedures of a film application method using the film application device 1 according to the present embodiment will be described while referencing FIG. 2 and FIGS. 9 to 15. The film application method includes a frame body preparing step, a film disposing step, a first tensioning step, a first pressing step, a first moving step, a second tensioning step, a second pressing step, a second moving step, and a cutting step.

The frame body preparing step is a step in which the frame body 50 is prepared that supports the peripheral edge of the film W at a position more to an outer periphery side than the vehicle 100 (see FIG. 2). In this step, the frame body 50 is provided at a position higher than the roof 102 of the vehicle 100.

The film disposing step is a step in which the film W is disposed above the vehicle 100 (see FIG. 2). In this step, the film supply unit 6 supplies the film W to the frame body 50. Due to the fact that the frame body 50 is pre-disposed above the vehicle 100, the film W is also disposed above the vehicle 100. Once the film W is disposed on the frame body 50, an edge portion on the positive side in the Y-axis direction of the film W is cut (see FIG. 9).

Figure 9:
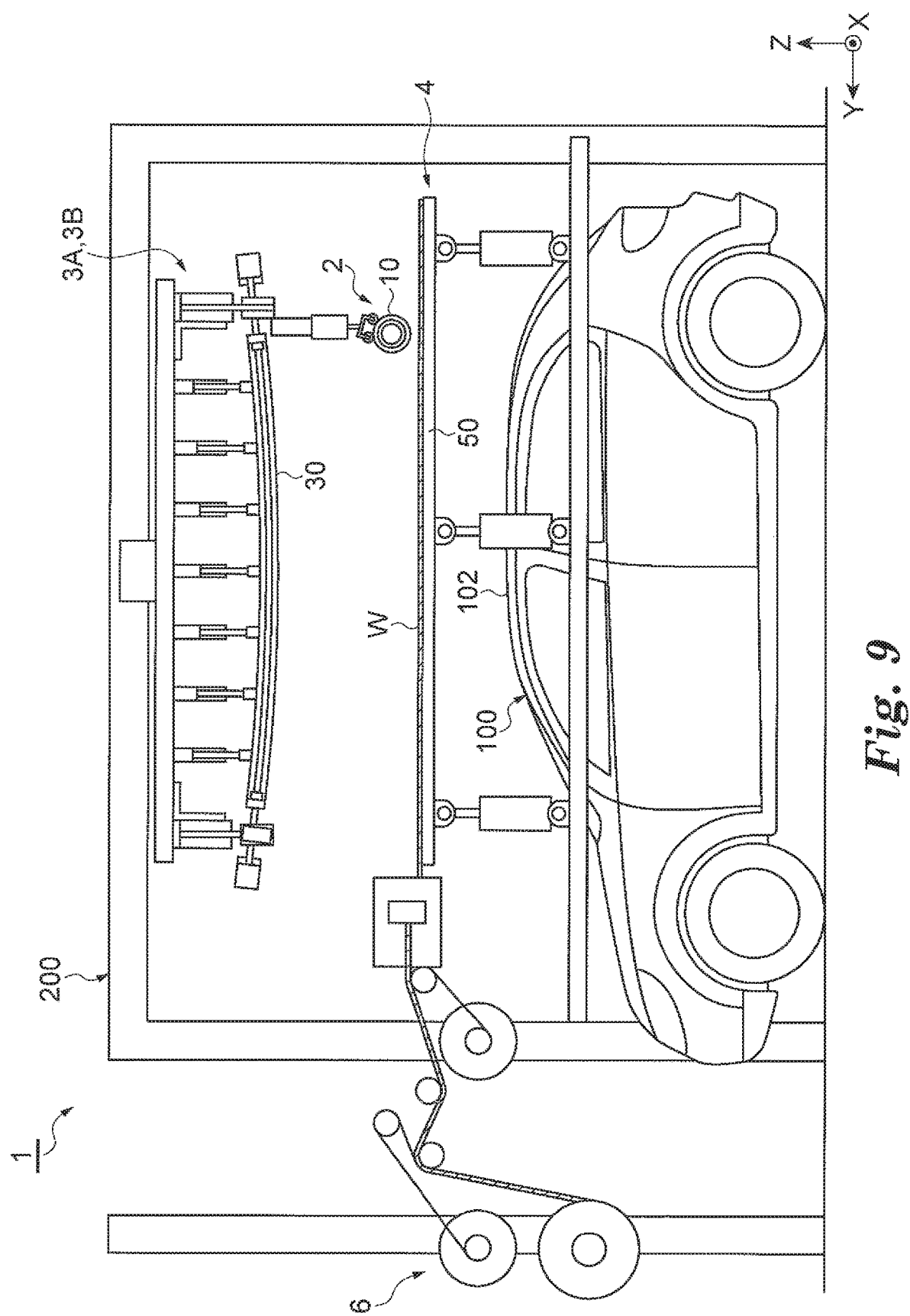
FIG. 9 is a drawing for describing a procedure of a film application method according to the present embodiment.
Figure 10:
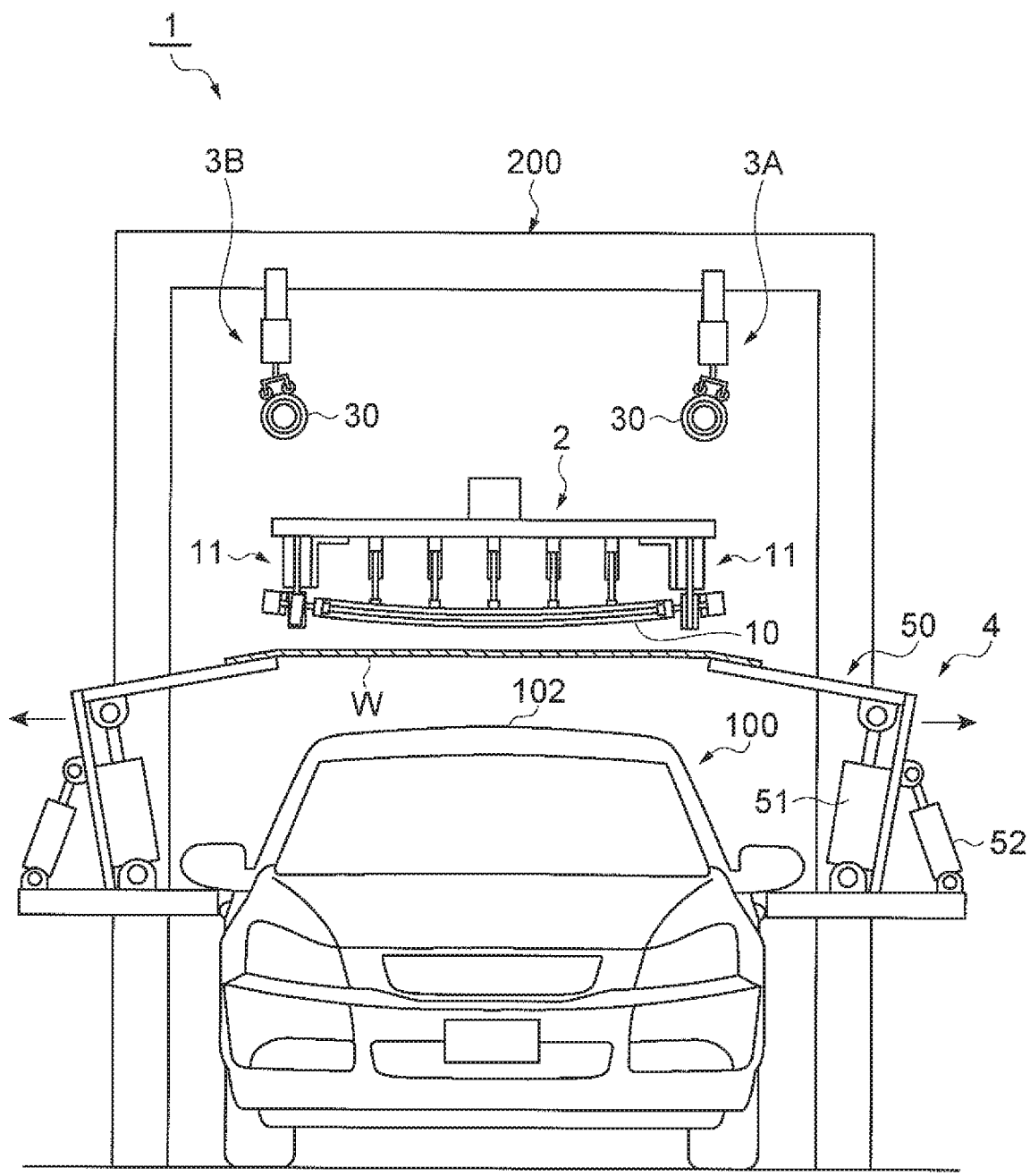
FIG. 10 is a drawing for describing a procedure of a film application method according to the present embodiment.

The first tensioning step is a step in which the first rod 10 is prepared and tension outward in the X-axis direction is imparted to the first rod 10 (see FIGS. 9 and 10). In this step, the first film application unit 2 is lowered and disposed at an application preparation position of the film W. Additionally, the first tensioning parts 11 are moved outward in the X-axis direction and, thereby, tension outward in the X-axis direction is imparted to the first rod 10. As such, even if a center portion of the first rod 10 is slightly sagging, due to its own weight prior to the tensioning, a substantially linearly stretched state of the first rod 10 can be obtained by the tensioning.

Figure 11:
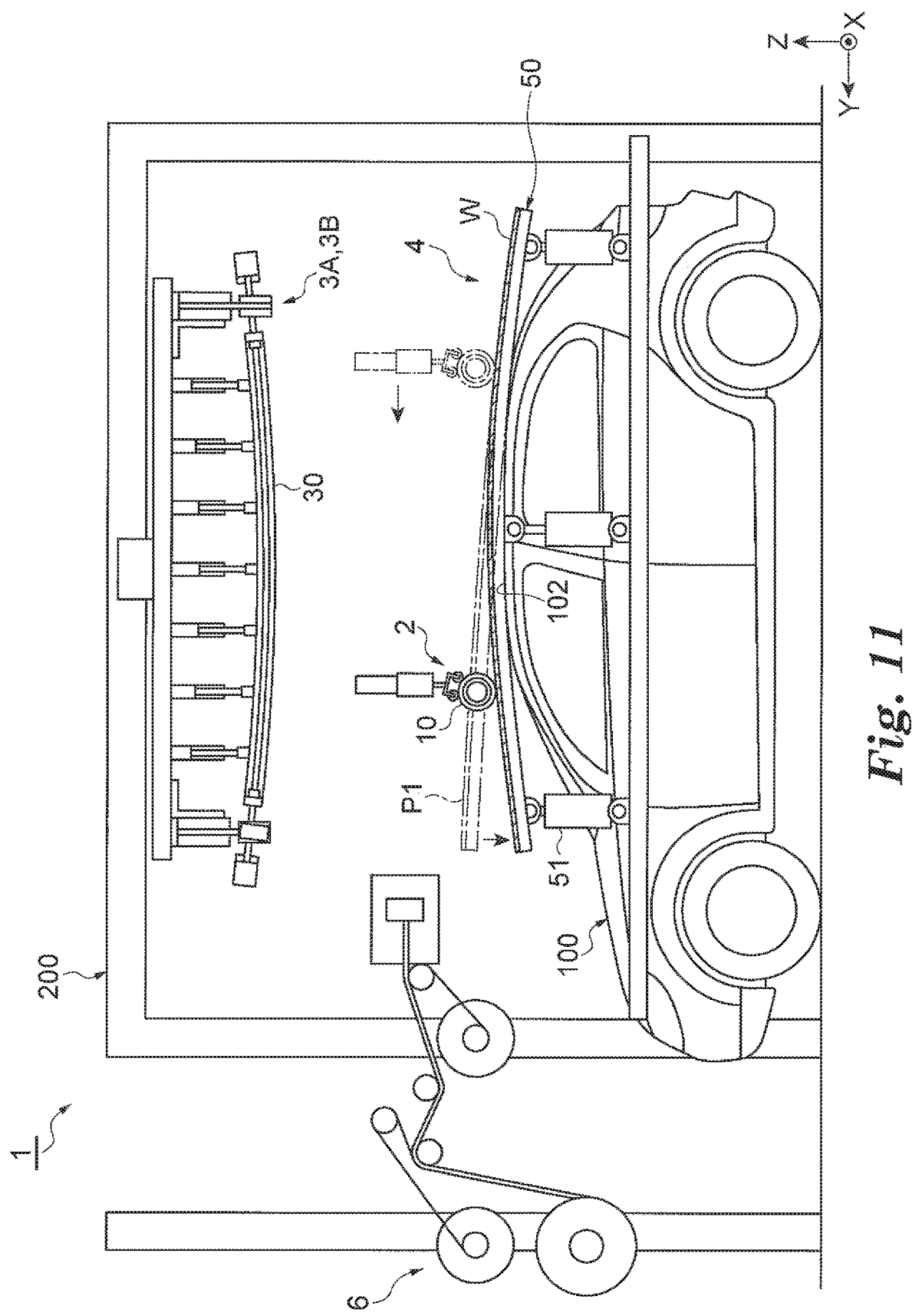
FIG. 11 is a drawing for describing a procedure of a film application method according to the present embodiment.
Figure 12:
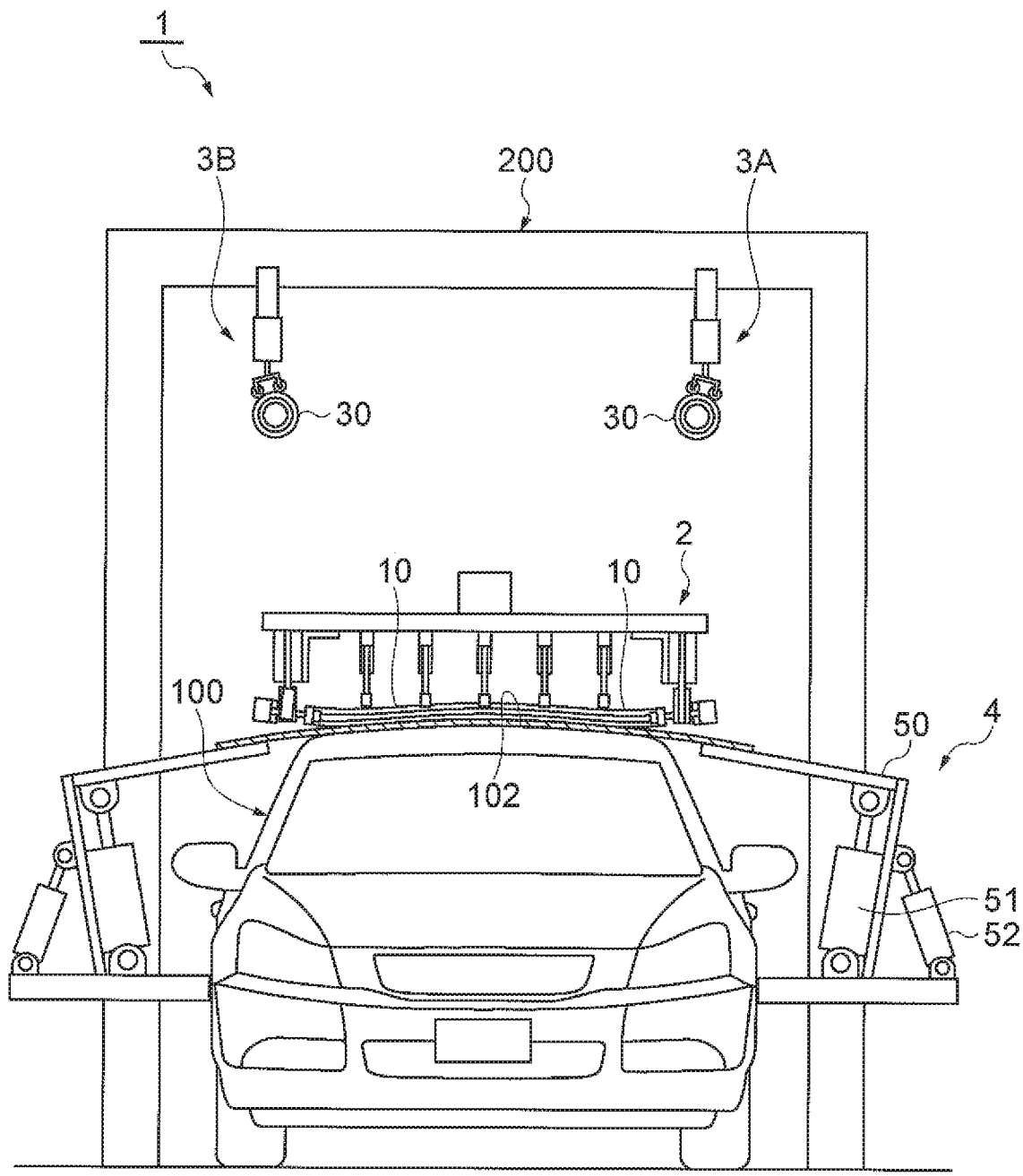
FIG. 12 is a drawing for describing a procedure of a film application method according to the present embodiment.

The first pressing step is a step in which the first rod 10 is lowered downward and the film W is pressed against the vehicle 100 (see FIGS. 11 and 12). In this step, the first rod 10 is lowered downward by the first movement part 12 of the first film application unit 2, and the first rod 10 is pressed on by the first pressure rollers 23 (see FIGS. 4A and 4B). Additionally, at a stage prior to the first pressing step, the frame body 50 imparts tension outward in the planar direction to the film W (see FIG. 10). Additionally, the edge portion on the negative side in the Y-axis direction of the frame body 50 is positioned at a position corresponding to the position of the roof 102 of the vehicle 100 by the driving of the drive units 51 at corresponding locations. At this time, the frame body 50 is in the state indicated by P1 in FIG. 11.

The first moving step is a step in which the first rod 10 is moved in the Y-axis direction (see FIGS. 11 and 12). In this step, the first rod 10 is moved in the Y-axis direction by the first movement part 12 of the first film application unit 2. At this time, the first rod 10 applies the film W to the roof 102 while deforming along the curving shape of the roof 102 of the vehicle 100. In the first moving step, the first pressure rollers 23 move with the first rod. 10 while saddling, the first rod 10 in a pressed state. Note that, in the first moving step, the frame body 50 is capable of deforming, so as to correspond to the curving shape at an application location of the roof 102 of the vehicle 100. That is, by moving the frame body 50 in part by the driving of the drive units 51 at each position, when viewed from the X-axis direction, the frame body 50 assumes a curving shape that corresponds to the roof 102. As a result, it is easier for the first rod 10 to apply the film W. Upon completion of the first moving step, the first film application unit 2 is returned to its original position.

The second tensioning step is a step in which the pair of second rods 30 is prepared and tension outward in the Y-axis direction is imparted to the second rods 30. In this step, the second film application units 3A and 3B are lowered and disposed at an application preparation position of the film W. Additionally, the second tensioning parts 31 (see FIGS. 5A and 5B) are moved outward in the Y-axis direction and, thereby, tension outward in the Y-axis direction is imparted to the second rods 30.

Figure 13:
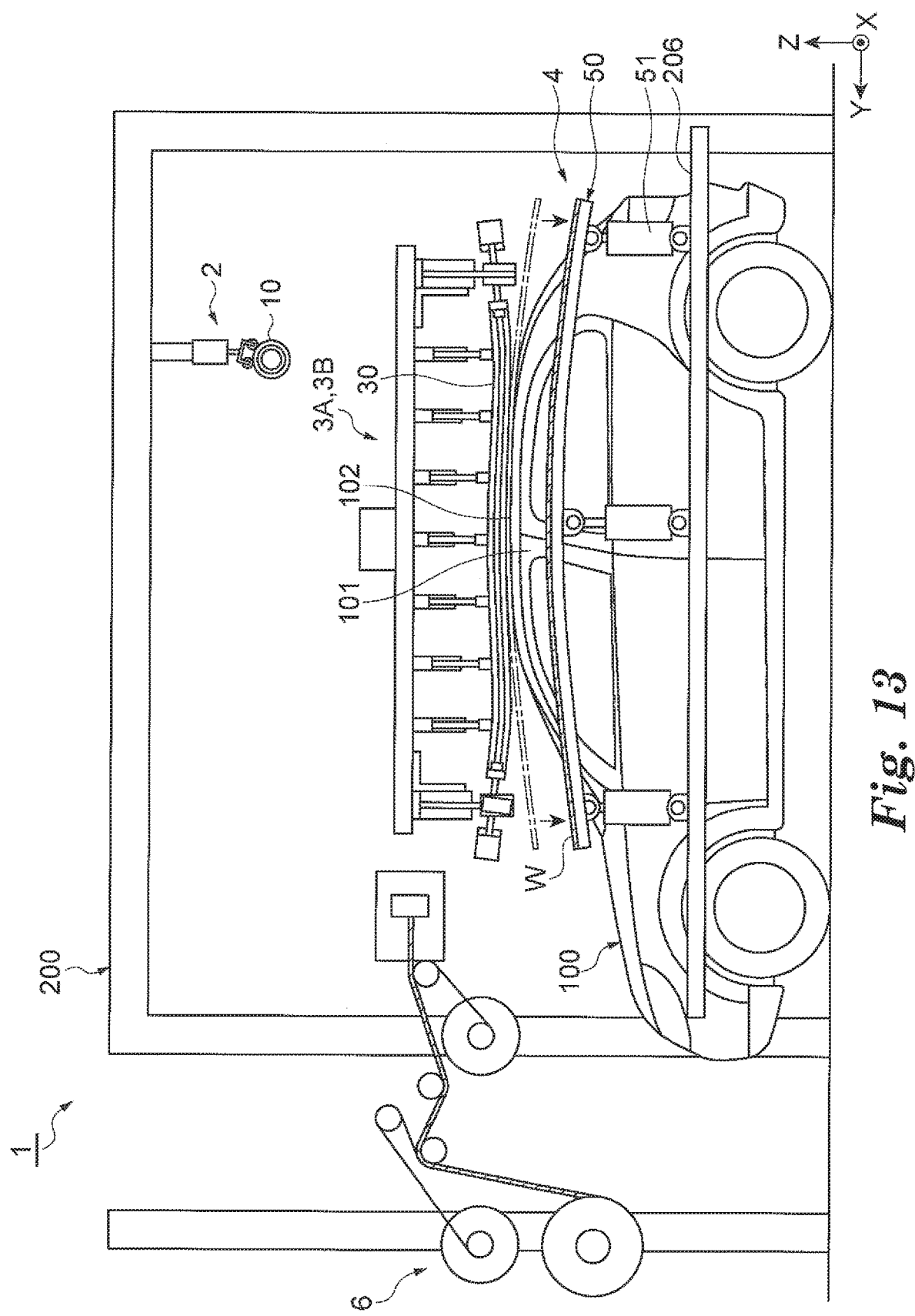
FIG. 13 is a drawing for describing a procedure of a film application method according to the present embodiment.
Figure 14:
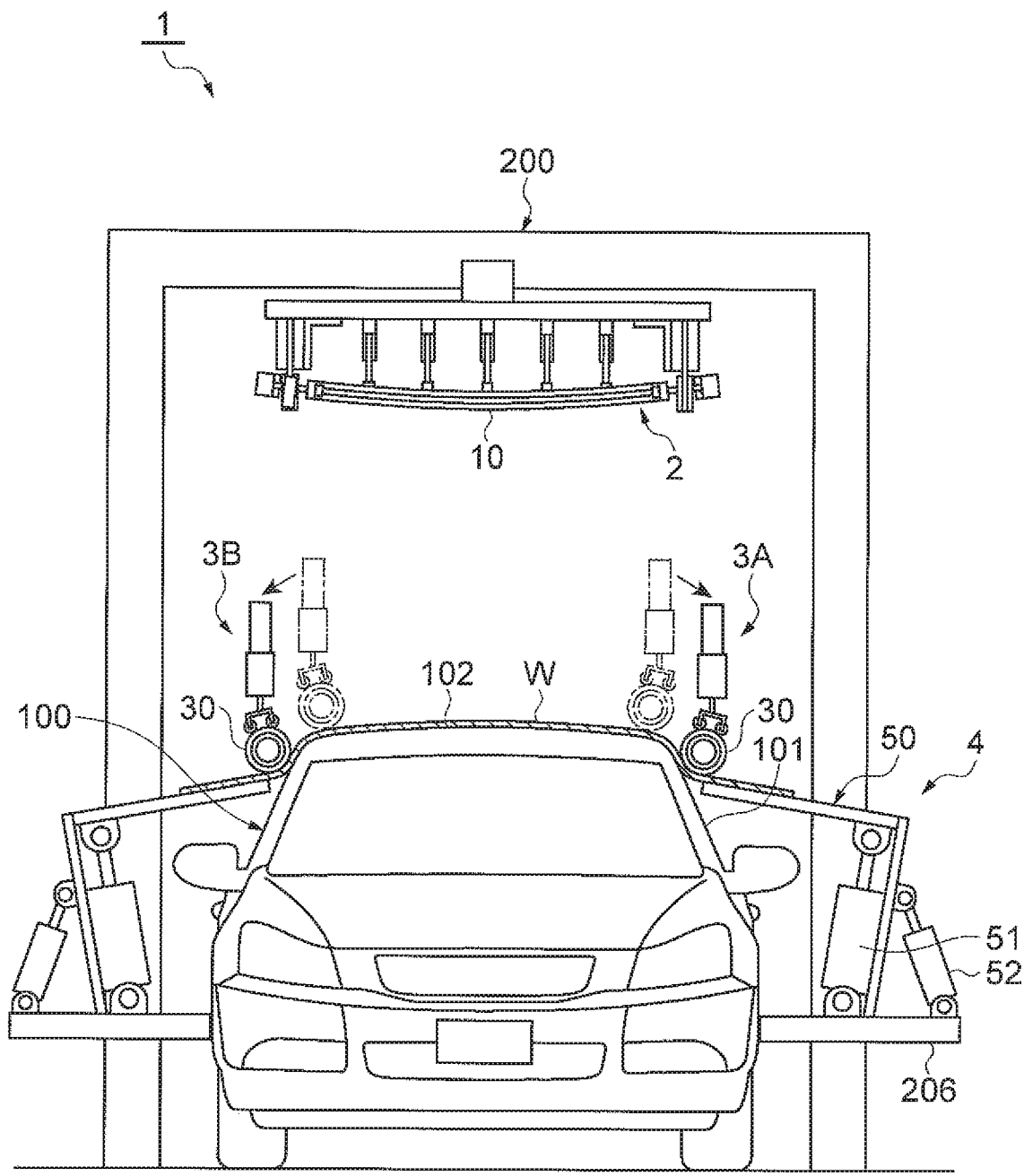
FIG. 14 is a drawing for describing a procedure of a film application method according to the present embodiment.

The second pressing step is a step in which the pair of second rods 30 is lowered downward and the film W is pressed against the vehicle 100 (see FIGS. 13 and 14). In this step, the second rods 30 are lowered downward by the second movement parts 32 of the second film application units 3A and 3B, and the second rods 30 are pressed on by the second pressure rollers 43 (see FIGS. 5A and 5B).

The second moving step is a step in which the second rods 30 are moved in the X-axis direction (see FIGS. 13 and 14).

In this step, the second rods 30 are moved in the X-axis direction by the second movement parts 32 of the second film application units 3A and 3B. At this time, the second rods 30 apply the film W to the edge portion of the roof 102 and the side walls 101 while deforming along the curving shape of the edge portion of the roof 102 and the side walls 101 of the vehicle 100. In the second moving step, the second pressure rollers 43B (see FIG. 6B) move with the second rods 30 while pressing the second rods 30 against the side walls 101 of the vehicle 100 from the X-axis direction. Note that in the second moving step, the frame body 50 is lowered downward in accordance with the application location. At this time, the position of the frame body 50 is lowered due to the pedestal portion 206 being lowered. Upon completion of the second moving step, the second film application units 3A and 3B are returned to their original positions.

Figure 15:
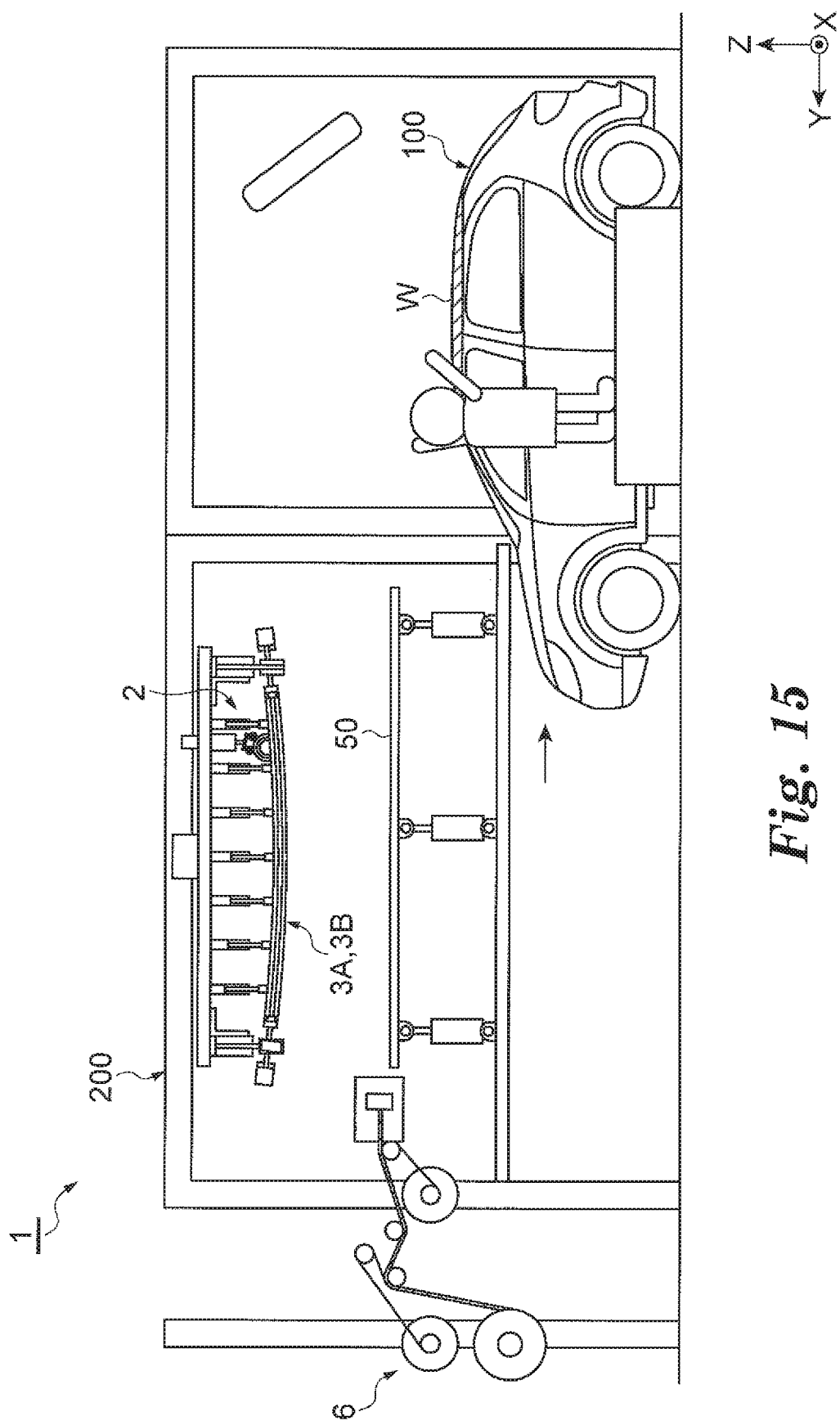
FIG. 15 is a drawing for describing a procedure of a film application method according to the present embodiment.

The cutting step is a step in which the edge portion of the film W that is applied to the roof 102 and to the side walls 101 of the vehicle is cut to a desired shape (see FIG. 15). In this step, the vehicle 100 is moved from the film application device 1 to a different work location. An operator cuts the edge portion of the film W to the shape of the side walls 101 of the vehicle 100, Thus, the film application method is completed.

Next, the actions and effects of the film application device 1 and the film application method according to the present embodiment will be described.

With the film application device 1 according to the present embodiment, the first tensioning, part 11 imparts tension outward in the X-axis direction to the first rod 10 that extends in the X-axis direction. Additionally, the first movement part 12 can press the first rod 10 against the vehicle 100 by lowering downward the first rod 10 to which tension is imparted. Here, the first rod 10 deforms and conforms to the shape of the vehicle 100. Accordingly, in cases where the object not only has locations where the sloping angle is moderate, but also has locations where the sloping angle is great (e.g. the edge portions of the roof 102 and the side walls 101), such as the roof 102 of the vehicle 100, the first rod 10 can deform so as to conform to the locations where the sloping angle is great. While deformed in this manner, the first rod 10 moves in the Y-axis direction while pressing on the film W and, thereby, the film W can also be excellently applied to the locations where the sloping angle is great. As a result of this configuration, the film W can be applied to both locations where the sloping angle is moderate and locations where the sloping angle is great in the vehicle 100.

With the film application device 1, the first rod 10 includes the core portion 16 with a Shore A hardness of 60 to 90; and the application part 17 disposed on the outer periphery side of the core portion 16, that has a lower hardness than at least the core portion 16. By using the first rod 10 with this configuration, the first rod 10 can perform the application of the film W with sufficient pressing force while sufficiently conforming to the shape of the vehicle 100.

With the film application device 1, the application portion 17 may have a shore B hardness of 20 to 50. By using the first rod 10 with this configuration, the first rod 10 can perform the application of the film W with sufficient pressing force while sufficiently conforming to the shape of the vehicle 100.

The film application device 1 further includes the first pressure rollers 23 that move with the first rod 10 while pressing the first rod 10 against the vehicle 100. As a result of this configuration, sufficient pressing force can be applied to the film W by the first pressure rollers 23 via the first rod 10.

The film application device 1 further includes the second rod 30 that extends in the Y-axis direction, presses on the film W disposed on the edge portion side in the X-axis direction of the vehicle 100 from the X-axis direction side, deforms corresponding to the shape of the vehicle 100, and moves in the X-axis direction; and the second pressure rollers 43 that move with the second rod 30 while pressing the second rod 30 against the vehicle 100. As a result of this configuration, the second rod 30 can excellently apply the film to the side walls 101 of the vehicle 100. Additionally, the movement of each of the rods 10 and 30 can be simplified and, thereby, the work of applying the film W can be performed in a short period of time.

With the film application device 1, the second pressure roller 43B is capable of pressing the second rod 30 toward the X-axis direction, against the film W and the vehicle 100. As a result of this configuration, the second rod 30 can press the film W against the side walls 101 with sufficient pressing force.

With the film application device 1, the film supporting unit 4 includes the frame body 50, at the position more to the outer periphery side than the vehicle 100, that supports the peripheral edge of the film W; and the frame body 50 imparts tension outward in the planar direction to the film W. As a result of this configuration, when the first rod 10 applies the film W, the film W can be positioned at a position where application is easier.

With the film application device 1, the frame body 50 is capable of adjusting the distance between the film W and the vehicle 100 at the start of the application of the film W. As a result of this configuration, the frame body 50 can be positioned at a location where application of the film W is easier.

With the film application device 1, the frame body 50 is capable of curving corresponding to the curving shape of the vehicle 100. As a result of this configuration, the frame body 50 can support the film W with a shape that matches the curving shape of the vehicle 100.

With the film application device 1, when applying the film W to the vehicle 100 using the first rod 10, the frame body 50 deforms and conforms to the curving shape at the application location of the vehicle 100. As a result of this configuration, during film application, the frame body 50 can position the film W at a location where application by the first rod 10 is easier.

The film application method according to the present embodiment is a film application method for applying the film W to the vehicle 100. The method includes the film disposing step for disposing the film W above the vehicle; the first tensioning step for preparing the first rod 10 that extends in the X-axis direction, and deforms and conforms to the shape of the vehicle 100, and imparting tension outward in the X-axis direction to the first rod 10; the first pressing step for lowering the first rod 10 downward and pressing the film W against the vehicle 100; and the first moving step for moving the first rod 10 in the Y-axis direction.

According to this aspect, actions and effects similar to those described above for the film application device 1 can be obtained.

The film application method further includes the second tensioning step for preparing the second rod 30 that extends in the Y-axis direction, and deforms and conforms to the shape of the vehicle 100, and imparting tension outward in the Y-axis direction to the second rod 30; the second pressing step for lowering the second rod 30 downward and pressing the film W against the vehicle 100; and the second moving step for moving the second rod 30 in the X-axis direction. In this method, the first moving step includes applying the film W to the roof 102 of the vehicle 100, and the second moving step includes applying the film W to the side walls 101 of the vehicle 100. As a result of this configuration, the second rod 30 can excellently apply the film to the side walls 101 of the vehicle 100.

With the film application method, in the second moving step, the second pressure rollers 43 move with the second rods 30 while pressing the second rods 30 against the vehicle 100 from the X-axis direction. As a result of this configuration, the second rod 30 can press the film W against the side walls 101 with sufficient pressing force.

The film application method may further include the frame body preparing step for preparing the frame body 50, at the position more to the outer periphery side than the vehicle 100, that supports the peripheral edge of the film W. As a result of this configuration, when the first rod 10 applies the film W, the film W can be positioned at a position where application is easier.

With the film application method, in the first moving step, the frame body 50 is capable of deforming so as to correspond to the curving shape at an application location of the vehicle 100, As a result of this configuration, the frame body 50 can support the film W with a shape that matches the curving shape of the vehicle 100.

The present invention is not limited to the embodiment described above.

The film application device 1 according to the embodiment described above was described as an example of the film application device, but the configuration thereof may be appropriately modified without departing from the scope of the invention. For example, a film application device 300 such as that illustrated in FIGS. 16 and 17 may be used. With the film application device 300 illustrated in FIGS. 16 and 17, one film application unit 302 is capable of movement in both the Y-axis direction and the X-axis direction. As illustrated in FIG. 16, the film application unit 302 applies the film W to the roof 102 of the vehicle 100 by moving in the Y-axis direction. Thereafter, the film application unit 302 rotates 90 degrees. Then, as illustrated in FIG. 17, the film application unit 302 can apply the film W to the side walls of the vehicle 100 by moving in the X-axis direction.

Additionally, a film supporting unit 350 included in the film application unit 302 differs from the film supporting unit 4 according to the embodiment described above in that front and back end portions are supported by the pillars 201, and the film supporting unit supports the film W and moves in the vertical direction while being guided by the pillars 201. Such a configuration may be implemented as the film supporting unit.

Figure 18A:
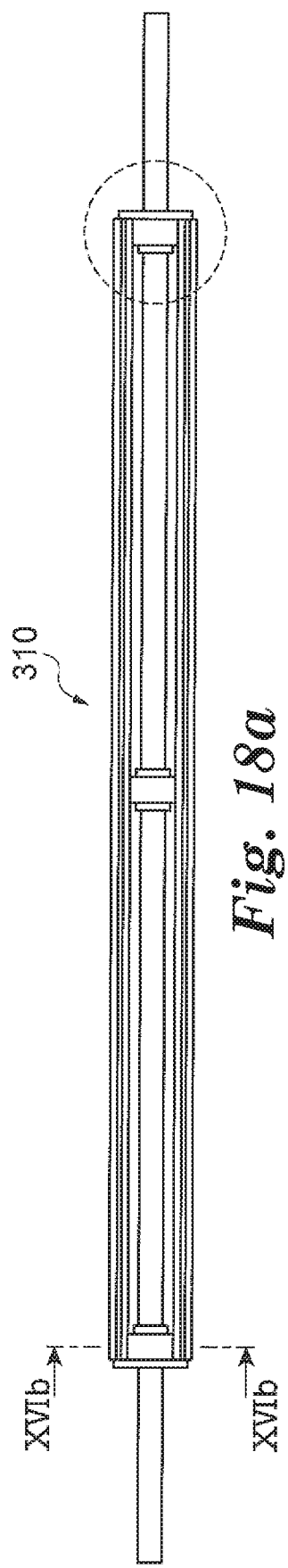
FIGS. 18A to 18C are drawings illustrating a rod according to a modified example.
Figure 18C:
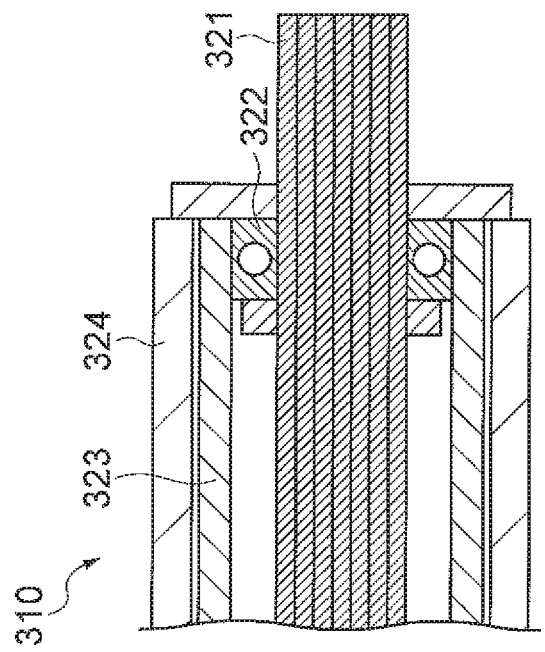
Figure 18B:
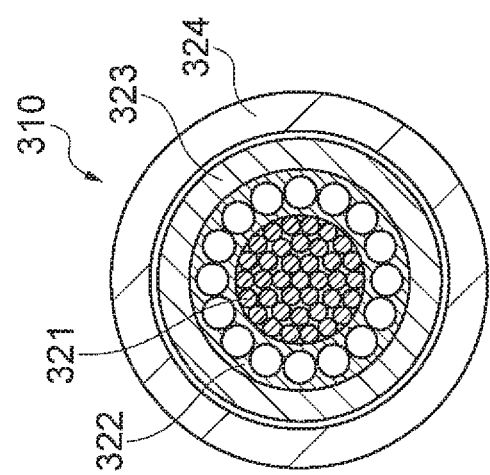

Additionally, a rod 310 included in the film application device 300 may have a configuration that differs from that of the rod according to the embodiment described above. Specifically, as illustrated in FIGS. 18A to 18C, the rod 310 includes a core portion 321, an outer periphery portion 323, a rubber portion 324 that covers the outer surface of the outer periphery portion 323 and corresponds to the application part, and bearings 322 provided between the core portion 321 and the outer periphery portion 323. The core portion 321 is constituted by bundling a plurality of metal cables, and can be used as the shaft of the rod 310. Note that the bearings 322 are provided at a plurality of locations in the axial direction, and can rotate the outer periphery portion 323 and the rubber portion 324 independent of the core portion 321. A material capable of deforming so as to conform to the shape of the vehicle 100 can be used as for outer periphery portion 323. Examples thereof include rubber materials with a Shore A hardness of 60 to 90. Additionally, a sponge rubber member with a Shore B hardness of 20 to 50 can be used for the rubber portion 324. As describe above, any type of rod may be used, provided that it can deform and conform to the shape of the vehicle 100.

Note that, in the embodiment described above, the object to which the film is applied was a vehicle as an example. However, the object to which the film is applied is not limited to vehicles, and the film may be applied to any object that has a roof and side walls. Examples of such objects include trains, aircraft, furniture, electronic products, and the like.

REFERENCE SIGNS LIST

1 Film application device
4 Film supporting unit
10 First rod
11 First tensioning part
12 First movement part
16 Core portion
17 Application portion
23 First pressure roller
30 Second rod
31 Second tensioning part
32 Second movement part
43 Second pressure roller
100 Vehicle
101 Side wall
102 Roof
W Film

The invention claimed is:

1. A film application device for applying a film to an object, comprising:
   a film supporting unit that disposes a film above the object;
   a first rod that extends in a first direction that intersects a vertical direction, presses on the film disposed above the object from an upper side, deforms and conforms to a shape of the object, and moves in a second direction that intersects the first direction and the vertical direction;
   a tensioning part that imparts tension outward in the first direction on at least a first end side in the first direction of the first rod, wherein the tensioning part includes a support part that supports an end portion of the first rod, a drive unit capable of moving the support part in the first direction, and a coupling part that links the drive unit and the support part; and
   a movement part that moves the first rod in the vertical direction.

2. The film application device according to claim 1, wherein:
   the first rod comprises:
   a core portion; and
   an application part disposed on an outer periphery side of the core portion, that has a lower hardness than at least the core portion.

3. The film application device according to claim 2, wherein:
   the core portion comprises a cylindrical member that has a Shore A hardness of 60 to 90; and the application part comprises a member that has a Shore B hardness of 20 to 50.

4. The film application device according to claim 1, further comprising:
a first pressure roller that moves with the first rod while pressing the first rod against the object.

5. The film application device according to claim 1, further comprising:
a second rod that extends in the second direction, presses on the film disposed on an edge portion side in the first direction of the object from the first direction side, deforms corresponding to a shape of the object, and moves in the first direction; and
a second pressure roller that moves with the second rod while pressing the second rod against the object.

6. The film application device according to claim 5, wherein:
the second pressure roller is capable of pressing the second rod toward the first direction against the film and the object.

7. The film application device according to claim 1, wherein:
the film supporting unit includes a frame body at a position more to an outer periphery side than the object, that supports a peripheral edge of the film; and
the frame body imparts tension outward in a planar direction to the film.

8. The film application device according to claim 7, wherein:
the frame body is capable of adjusting a distance between the film and the object at the start of the application of the film.

9. The film application device according to claim 7, wherein:
the frame body is capable of curving corresponding to a curving shape of the object.

10. The film application device according to claim 9, wherein:
when the film is being applied to the object by the first rod, the frame body deforms and conforms to the curving shape at an application location of the object.

11. A film application method for applying a film to an object, the method comprising:
a film disposing step for disposing the film above the object;
a first tensioning step for preparing a first rod that extends in a first direction that intersects a vertical direction, and deforms and conforms to a shape of the object, and imparting tension outward in the first direction on the first rod by using a drive unit capable of moving, in the first direction, a support part that supports an end portion of the first rod, wherein a coupling part links the drive unit and the support part;
a first pressing step for lowering the first rod downward and pressing the film against the object; and
a first moving step for moving the first rod in a second direction that intersects the first direction and the vertical direction.

12. The film application method according to claim 11, the method further comprising:
a second tensioning step for preparing a second rod that extends in the second direction, and deforms and conforms to a shape of the object, and imparting tension outward in the second direction on the second rod;
a second pressing step for lowering the second rod downward and pressing the film against the object; and
a second moving step for moving the second rod in the first direction; wherein
the first moving step includes applying the film to a roof of the object; and
the second moving step includes applying the film to a side wall of the object.

13. The film application method according to claim 12 wherein:
the second moving step includes moving the pressure roller with the second rod while pressing the second rod against the object from the first direction.

14. The film application method according to claim 11, further comprising:
a frame body preparing step for preparing a frame body, at a position more to an outer periphery side than the object, that supports a peripheral edge of the film.

15. The film application method according to claim 14, wherein:
in the first moving step, the frame body is capable of deforming so as to correspond to a curving shape at an application location of the object.

* * * * *

UNITED STATES PATENT AND TRADEMARK OFFICE
CERTIFICATE OF CORRECTION

PATENT NO. : 11,173,651 B2
APPLICATION NO. : 16/336733
DATED : November 16, 2021
INVENTOR(S) : Michel Laurent It is certified that error appears in the above-identified patent and that said Letters Patent is hereby corrected as shown below:

In the Claims

<u>Column 18</u>
Line 30 (approx.), In Claim 13, delete "the pressure roller" and insert -- a pressure roller --, therefor.

Signed and Sealed this
Twenty-sixth Day of April, 2022

Katherine Kelly Vidal
*Director of the United States Patent and Trademark Office*